(12) United States Patent
John et al.

(10) Patent No.: US 10,997,949 B2
(45) Date of Patent: May 4, 2021

(54) TIME SYNCHRONIZATION BETWEEN ARTIFICIAL REALITY DEVICES

(71) Applicant: Facebook Technologies, LLC, Menlo Park, CA (US)

(72) Inventors: Brian Henry John, Redwood City, CA (US); Gang Lu, Pleasanton, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/737,778

(22) Filed: Jan. 8, 2020

(65) Prior Publication Data
US 2021/0104211 A1    Apr. 8, 2021

Related U.S. Application Data

(60) Provisional application No. 62/910,936, filed on Oct. 4, 2019.

(51) Int. Cl.
*G09G 5/12*   (2006.01)
*G06T 19/00*   (2011.01)
(Continued)

(52) U.S. Cl.
CPC ............. *G09G 5/12* (2013.01); *G02B 27/017* (2013.01); *G06F 3/012* (2013.01); *G06T 19/006* (2013.01)

(58) Field of Classification Search
CPC ......... G06F 3/011–012; G06F 3/04815; G06F 3/013; G09G 2370/16; G09G 5/12; G06T 19/006; H04N 21/8547; H04N 21/4305; H04N 21/43637; H04N 21/4307; H04N 21/4302; H04J 3/0664; H04J 3/0667;
(Continued)

(56) References Cited

U.S. PATENT DOCUMENTS 10,714,055 B1 * 7/2020 Strasdat ................ G06F 3/013
2014/0143582 A1   5/2014 Kindred et al.
(Continued)

OTHER PUBLICATIONS

Ghasempour et al., "IEEE 802.11ay: Next-Generation 60 GHz Communication for 100 Gb/s Wi-Fi," IEEE Comunications Magazine: 55(12), Dec. 2017, pp. 186-192.
(Continued)

*Primary Examiner* — Sanjiv D. Patel
(74) *Attorney, Agent, or Firm* — Shumaker & Sieffert, P.A.

(57) ABSTRACT

An artificial reality system includes a head-mounted display (HMD) configured to output artificial reality content, wherein the HMD includes a first wireless transceiver to communicate with one or more devices of the artificial reality system; a peripheral device of the one or more devices of the artificial reality system configured to capture media samples for the HMD to output the artificial reality content, wherein the peripheral device includes a second wireless transceiver to communicate with the HMD; a clock manager of the HMD configured to compute a first delta between a timestamp of the HMD and a timestamp of the first wireless transceiver; and a clock manager of the peripheral device configured to compute a second delta between a timestamp of the peripheral device and a timestamp of the second wireless transceiver, wherein the first delta and the second delta are used to adjust a clock of the peripheral device.

20 Claims, 11 Drawing Sheets

(51) Int. Cl.
*G06F 3/01* (2006.01)
*G02B 27/01* (2006.01)

(58) Field of Classification Search
CPC ...... H04J 3/0644; H04J 3/0655; H04J 3/0661;
H04J 3/0673; H04J 3/14; H04J 3/0682;
H04J 3/0685; H04J 3/0638; H04J 3/065
See application file for complete search history.

(56) References Cited

U.S. PATENT DOCUMENTS

| | | |
|---|---|---|
| 2016/0278082 A1* | 9/2016 | Aoki ................... H04W 74/00 |
| 2017/0302972 A1* | 10/2017 | Zhang .................... H04L 67/38 |
| 2017/0324888 A1 | 11/2017 | Boone et al. |
| 2018/0330521 A1* | 11/2018 | Samples ............. F21V 23/0471 |
| 2019/0108652 A1* | 4/2019 | Linde ..................... G06T 7/292 |
| 2019/0110264 A1 | 4/2019 | Chung et al. |
| 2019/0243472 A1* | 8/2019 | Stafford ................. A63F 13/26 |

OTHER PUBLICATIONS

Bellalta, "IEEE 802.11ax: High-Efficiency WLANs," IEEE Wireless Communications Magazine, Jul. 28, 2015, 16 pp.
"802.11-2016—IEEE Standard for Information Technology—Telecommunications and information exchange between systems Local and metropolitan area networks—Specific requirements—Part 11: Wireless LAN Medium Access Control (MAC) and Physical Layer (PHY) Specifications," Chapter 11 MLME; Section 11.1 Synchronization, Dec. 14, 2016, pp. 1581-1599.
International Search Report and Written Opinion of International Application No. PCT/US2020/049082, dated Nov. 30, 2020, 11 pages.

* cited by examiner

TIME SYNCHRONIZATION BETWEEN ARTIFICIAL REALITY DEVICES

This application claims the benefit of U.S. Provisional Patent Application No. 62/910,936 filed on Oct. 4, 2019, which is hereby incorporated by reference herein in its entirety.

TECHNICAL FIELD

The disclosure generally relates to artificial reality systems, such as augmented reality, mixed reality, and/or virtual reality systems.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality, an augmented reality, a mixed reality, a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may entirely comprise content that is generated by the system or may include generated content combined with captured content (e.g., real-world video and/or images). During operation, the user typically interacts with the artificial reality system to select content, launch applications, configure the system and, in general, experience artificial reality environments.

SUMMARY

In general, the disclosure describes techniques for time synchronization between devices within a multi-device Artificial Reality (AR) system. An example multi-device AR system may include a peripheral device that operates as a co-processing AR device with a head-mounted display (HMD) to provide, for example, audio and/or image capture and playback for an artificial reality environment. These devices may, for example, be in wireless communication with each other, and each device may include multiple clock domains, such as respective clock domains associated with wireless transceivers in each device as well as system clock domains associated with processors and other hardware within each device. The techniques described herein enable precise clock synchronization across the various clock domains of the multiple devices. The techniques may be particularly advantageous when the individual devices may support various power modes, such as a sleep (low power) mode and a fully operational mode. In such environments, the various power modes may provide different granular levels of clock monitoring and control, thus leading to potential technical problems associated with clock drift and misalignment between the devices. Although the examples described herein are described with respect to various power modes, the techniques described herein need not operate in various power modes and may be applicable to devices having various clock domains.

For example, the HMD and/or peripheral device may enter a low power mode in which the devices and/or wireless transceivers are driven by a slower oscillator to conserve power. When in low power mode, various factors, such as environmental factors (temperatures), variations in load, as well as the lower granularity of a slower oscillator, may cause the timing between the HMD and the peripheral device to drift over time.

As described herein, to compensate for drift, according to some examples, the timing of the HMD transceiver is first synchronized with the HMD, the timing of peripheral device transceiver is then synchronized to the HMD transceiver, and then the timing of the peripheral device is synchronized to the peripheral device transceiver. In some examples, the timing of the peripheral device transceiver is first synchronized with the peripheral device, the timing of the HMD transceiver is then synchronized to the peripheral device transceiver, and then the timing of the HMD is synchronized to the HMD transceiver.

As one example, to synchronize timing of the HMD transceiver to the HMD, the HMD transceiver generates an interrupt to the HMD and records a timestamp of the HMD transceiver (e.g., a Time Synchronized Function (TSF) timestamp). In response to receiving the interrupt, the HMD captures a timestamp of the HMD, computes a delta between the timestamps of HMD and HMD transceiver, and communicates the delta to the HMD transceiver, which in turn sends the delta to the peripheral device.

To synchronize timing between the wireless transceivers, the HMD transceiver transmits a timestamp of the HMD transceiver adjusted for any transmission delays to the peripheral device transceiver, which further adjusts the timestamp for any receiving delays, and adjusts a clock of the peripheral device transceiver using the adjusted timestamp to account for any offset between the wireless transceivers.

To synchronize timing between the peripheral device transceiver and the peripheral device, the peripheral device transceiver generates an interrupt to the peripheral device and records a timestamp of the peripheral device transceiver. Upon receiving the interrupt, the peripheral device captures a timestamp of the peripheral device, computes a delta between the timestamps of peripheral device and peripheral device transceiver, and adjusts a clock of the peripheral device using the delta received from the HMD and the delta computed between the timestamps of the peripheral device and peripheral device transceiver.

In one example, an artificial reality system includes a head-mounted display (HMD) configured to output artificial reality content, wherein the HMD includes a first wireless transceiver to communicate with one or more devices of the artificial reality system; a peripheral device of the one or more devices of the artificial reality system configured to capture media samples for the HMD to output the artificial reality content, wherein the peripheral device includes a second wireless transceiver to communicate with the HMD; a clock manager of the HMD configured to compute a first delta between a timestamp of the HMD and a timestamp of the first wireless transceiver; and a clock manager of the peripheral device configured to compute a second delta between a timestamp of the peripheral device and a timestamp of the second wireless transceiver, wherein the first delta and the second delta are used to adjust a clock of the peripheral device.

In another example, a method includes receiving, by a head-mounted display (HMD) configured to output artificial reality content, an interrupt from a wireless transceiver of the HMD to communicate with a peripheral device configured to capture media samples for the artificial reality content; in response to receiving the interrupt, recording, by the HMD, a timestamp of the HMD; obtaining, by the HMD, a timestamp of the wireless transceiver of the HMD that is recorded at the time the wireless transceiver of the HMD sent the interrupt; computing, by the HMD, a delta between the timestamp of the HMD and the timestamp of the wireless transceiver of the HMD; and sending, by the HMD, the delta to the peripheral device via the wireless transceiver of the HMD to cause the peripheral device to adjust a clock of the peripheral device using the delta.

In yet another example, a method includes receiving, by a peripheral device configured to capture media sample for the artificial reality content, a first delta between a timestamp of a head-mounted display (HMD) and a timestamp of a wireless transceiver of the HMD, wherein the HMD is configured to output artificial reality content; receiving, by the peripheral device, an interrupt from a wireless transceiver of the peripheral device; in response to receiving the interrupt, capturing, by the peripheral device, a timestamp of the peripheral device; obtaining, by the peripheral device, a timestamp of the wireless transceiver of the peripheral device, wherein the timestamp of the wireless transceiver of the peripheral device is recorded at the time the wireless transceiver of the peripheral device sent the interrupt; computing, by the peripheral device, a second delta between the timestamp of the peripheral device and the timestamp of the wireless transceiver of the peripheral device; and adjusting, by the peripheral device, a clock of the peripheral device using the first delta and the second delta.

The details of one or more examples are set forth in the accompanying drawings and the description below. Other features, objects, and advantages will be apparent from the description and drawings, and from the claims.

DETAILED DESCRIPTION

Figure 1A:
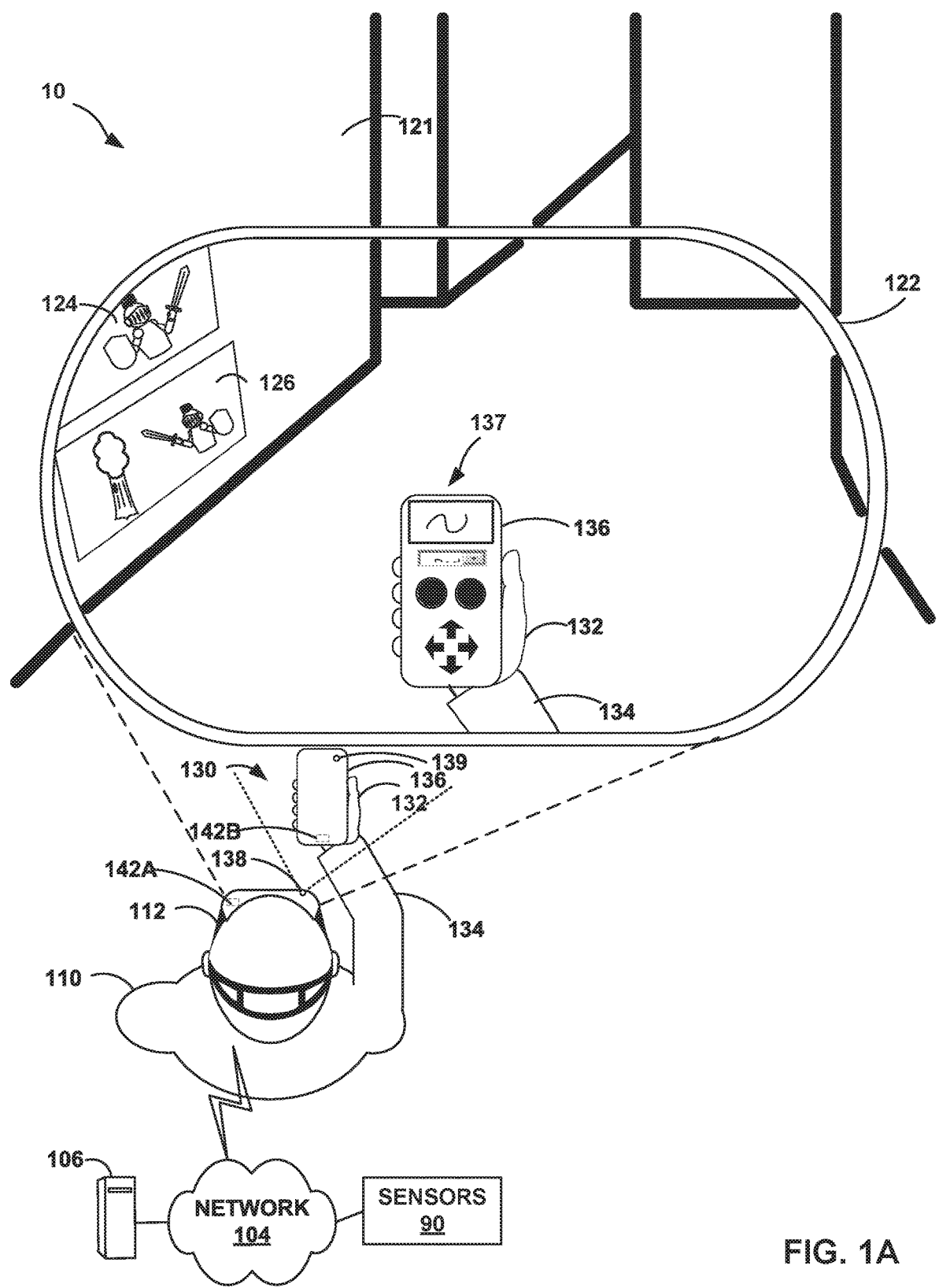
FIG. 1A is an illustration depicting an example multi-device artificial reality system that provides time synchronization across various clock domains of devices within a multi-device artificial reality (AR) system, in accordance with the techniques described in this disclosure.

FIG. 1A is an illustration depicting an example multi-device artificial reality system that provides time synchronization across various clock domains of devices within a multi-device Artificial Reality (AR) system, in accordance with the techniques described in this disclosure. In the example of FIG. 1A, artificial reality system 10 includes HMD 112, peripheral device 136, and may in some examples include one or more external sensors 90 and/or console 106.

As shown, HMD 112 is typically worn by user 110 and comprises an electronic display and optical assembly for presenting artificial reality content 122 to user 110. In addition, HMD 112 includes one or more sensors (e.g., accelerometers) for tracking motion of the HMD 112 and may include one or more image capture devices 138 (e.g., cameras, line scanners) for capturing image data of the surrounding physical environment. Although illustrated as a head-mounted display, AR system 10 may alternatively, or additionally, include glasses or other display devices for presenting artificial reality content 122 to user 110.

In this example, console 106 is shown as a single computing device, such as a gaming console, workstation, a desktop computer, or a laptop. In other examples, console 106 may be distributed across a plurality of computing devices, such as distributed computing network, a data center, or cloud computing system. Console 106, HMD 112, and sensors 90 may, as shown in this example, be communicatively coupled via network 104, which may be a wired or wireless network, such as Wi-Fi, a mesh network or a short-range wireless communication medium, or combination thereof. Although HMD 112 is shown in this example as in communication with, e.g., tethered to or in wireless communication with, console 106, in some implementations HMD 112 operates as a stand-alone, mobile artificial reality system.

In general, artificial reality system 10 uses information captured from a real-world, 3D physical environment to render artificial reality content 122 for display to user 110. In the example of FIG. 1A, a user 110 views the artificial reality content 122 constructed and rendered by an artificial reality application executing on HMD 112 and/or console 106. In some examples, artificial reality content 122 may comprise a mixture of real-world imagery (e.g., hand 132, peripheral device 136, walls 121) and virtual objects (e.g., virtual content items 124, 126 and virtual user interface 137) to produce mixed reality and/or augmented reality. In some examples, virtual content items 124, 126 may be mapped (e.g., pinned, locked, placed) to a particular position within artificial reality content 122. A position for a virtual content item may be fixed, as relative to one of wall 121 or the earth, for instance. A position for a virtual content item may be variable, as relative to peripheral device 136 or a user, for instance. In some examples, the particular position of a virtual content item within artificial reality content 122 is associated with a position within the real-world, physical environment (e.g., on a surface of a physical object).

In this example, peripheral device 136 is a physical, real-world device having a surface on which AR system 10 overlays virtual user interface 137. Peripheral device 136 may include one or more presence-sensitive surfaces for detecting user inputs by detecting a presence of one or more objects (e.g., fingers, stylus) touching or hovering over locations of the presence-sensitive surface. In some examples, peripheral device 136 may include an output display, which may be a presence-sensitive display. In some examples, peripheral device 136 may be a smartphone, tablet computer, personal data assistant (PDA), or other hand-held device. In some examples, peripheral device 136 may be a smartwatch, smartring, or other wearable device. Peripheral device 136 may also be part of a kiosk or other stationary or mobile system. Peripheral device 136 may or may not include a display device for outputting content to a screen.

In the example artificial reality experience shown in FIG. 1A, virtual content items 124, 126 are mapped to positions on wall 121. The example in FIG. 1A also shows that virtual content item 124 partially appears on wall 121 only within artificial reality content 122, illustrating that this virtual content does not exist in the real world, physical environment. Virtual user interface 137 is mapped to a surface of peripheral device 136. As a result, AR system 10 renders, at a user interface position that is locked relative to a position of peripheral device 136 in the artificial reality environment, virtual user interface 137 for display at HMD 112 as part of artificial reality content 122. FIG. 1A shows that virtual user interface 137 appears on peripheral device 136 only within artificial reality content 122, illustrating that this virtual content does not exist in the real-world, physical environment.

The artificial reality system 10 may render one or more virtual content items in response to a determination that at least a portion of the location of virtual content items is in the field of view 130 of user 110. For example, artificial reality system 10 may render a virtual user interface 137 on peripheral device 136 only if peripheral device 136 is within field of view 130 of user 110.

During operation, the artificial reality application constructs artificial reality content 122 for display to user 110 by tracking and computing pose information for a frame of reference, typically a viewing perspective of HMD 112. Using HMD 112 as a frame of reference, and based on a current field of view 130 as determined by a current estimated pose of HMD 112, the artificial reality application renders 3D artificial reality content which, in some examples, may be overlaid, at least in part, upon the real-world, 3D physical environment of user 110. During this process, the artificial reality application uses sensed data received from HMD 112, such as movement information and user commands, and, in some examples, data from any external sensors 90, such as external cameras, to capture 3D information within the real world, physical environment, such as motion by user 110 and/or feature tracking information with respect to user 110. Based on the sensed data, the artificial reality application determines a current pose for the frame of reference of HMD 112 and, in accordance with the current pose, renders the artificial reality content 122.

Artificial reality system 10 may trigger generation and rendering of virtual content items based on a current field of view 130 of user 110, as may be determined by real-time gaze tracking of the user, or other conditions. More specifically, image capture devices 138 of HMD 112 capture image data representative of objects in the real-world, physical environment that are within a field of view 130 of image capture devices 138. Field of view 130 typically corresponds with the viewing perspective of HMD 112. In some examples, the artificial reality application presents artificial reality content 122 comprising mixed reality and/or augmented reality. As illustrated in FIG. 1A, the artificial reality application may render images of real-world objects, such as the portions of peripheral device 136, hand 132, and/or arm 134 of user 110, that are within field of view 130 along the virtual objects, such as within artificial reality content 122. In other examples, the artificial reality application may render virtual representations of the portions of peripheral device 136, hand 132, and/or arm 134 of user 110 that are within field of view 130 (e.g., render real-world objects as virtual objects) within artificial reality content 122. In either example, user 110 is able to view the portions of their hand 132, arm 134, peripheral device 136 and/or any other real-world objects that are within field of view 130 within artificial reality content 122. In other examples, the artificial reality application may not render representations of the hand 132 or arm 134 of the user.

During operation, artificial reality system 10 performs object recognition within image data captured by image capture devices 138 of HMD 112 to identify peripheral device 136, hand 132, including optionally identifying individual fingers or the thumb, and/or all or portions of arm 134 of user 110. Further, artificial reality system 10 tracks the position, orientation, and configuration of peripheral device 136, hand 132 (optionally including particular digits of the hand), and/or portions of arm 134 over a sliding window of time. In some examples, peripheral device 136 includes one or more sensors (e.g., accelerometers) for tracking motion or orientation of the peripheral device 136. In some examples, peripheral device 136 may include media capture devices 139 to capture audio data and/or image data representative of objects in the real-world, physical environment that are within a field of view of media capture devices 139.

Multiple devices of artificial reality system 10 may work in conjunction in the AR environment, where each device may be a separate physical electronic device and/or separate integrated circuits (e.g., System on a Chip (SoC)) within one or more physical devices. For example, peripheral device 136 and HMD 112 may each include one or more SoCs configured to support an artificial reality application, such as SoCs operating as co-application processors, sensor aggregators, display controllers, etc. In the example of FIG. 1A, peripheral device 136 is operatively paired with HMD 112 to jointly operate within AR system 10 to provide an artificial reality experience, such as audio and/or image capture and playback. In the example of FIG. 1A, HMD 112 includes wireless transceiver 142A ("HMD transceiver 142A") to wirelessly communicate with peripheral device 136, and peripheral device 136 includes wireless transceiver 142B ("peripheral device transceiver 142B") to wirelessly communicate with HMD 112. In this example, HMD 112 and peripheral device 136 send and receive audio or image samples between the devices via wireless transceivers 142A and 142B (collectively, "wireless transceivers 142"). Wireless transceivers 142 may be configured in accordance with the Institute of Electrical and Electronics Engineers (IEEE) 802.11ay standard, IEEE 802.11ax standard, or other wireless communication standards. Additional examples of the 802.11ay standard are described in "IEEE 802.11ay: Next-Generation 60 GHz Communication for 100 Gb/s Wi-Fi," Volume: 55, Issue: 12, December 2017, the entire contents of which is incorporated by reference herein. Additional examples of the 802.11ax standard are described in "IEEE 802.11ax: High-Efficiency WLANs," Jul. 28, 2015, the entire contents of which is incorporated by reference herein.

HMD 112, peripheral device 136, and wireless transceivers 142 each include a clock, as further described below. A clock provides an oscillating signal (e.g., provided by an oscillator) that governs the speed at which the devices execute instructions and to coordinate a sequence of actions. In this example, HMD 112 and peripheral device 136 include multiple clock domains, such as respective clock domains associated with wireless transceivers as well as system clock domains associated with processors and other hardware within each device. For example, in one clock domain, HMD 112 and peripheral device 136 may each include a clock used for capturing or processing audio and/or image samples at a specific rate (e.g., frequency). For instance, media capture devices 139 of peripheral device 136 uses a local clock to capture audio and/or image samples at a specific frequency, and HMD 112 uses a local clock to process the audio and/or image samples at the same frequency. Alternatively, or additionally, image capture devices 138 of HMD 112 may use its local clock to capture image samples at a specific frequency, and peripheral device 136 uses its local clock to process the image samples for playback at the same frequency. In another clock domain, wireless transceiver 142A of HMD 112 and wireless transceiver 142B of peripheral device 136 may each include a clock used to synchronize timing between the wireless transceivers.

In some examples, wireless transceivers 142 may enter a low power mode in which the wireless transceivers are put on standby or suspended (otherwise referred to as "sleep mode") to conserve power. During low power mode, the clocks of the devices are driven by a slower, low-frequency oscillator. Although the respective low-frequency oscillators for HMD 112 and peripheral device 136 may nominally be the same, the oscillators have different actual frequencies, e.g., caused by environmental factors (e.g., temperatures) or variations in load, which accumulates drift over time and causes data rate mismatches. As one example, media capture devices 139 of peripheral device 136 operating in low power mode may use its local clock to capture audio or image samples at a first frequency (e.g., 32 kHz) provided by a first low-frequency oscillator of peripheral device 136. The audio or image samples are sent to HMD 112 using wireless transceiver 142B, which HMD in turn uses its local clock to process the samples for playback at a second frequency (e.g., 44.1 kHz) provided by a second low-frequency oscillator of HMD 112. In the case that oscillators on HMD 112 and peripheral device 136 have an accuracy of +/−20 parts per million (ppm), the oscillators could vary by up to 40 ppm, which will also be the average frequency by which the locally generated clocks will vary. At 40 ppm, a 44.1 kHz image stream on HMD 112 may vary by approximately 1.7 Hz, resulting in data rate mismatch between the capture of image samples and the playback of the image samples. Although the examples described herein are described with respect to various power modes, the techniques described herein need not operate in various power modes and may be applicable to devices having various clock domains.

In accordance with the techniques of this disclosure, artificial reality system 10 may provide time synchronization across various clock domains of multiple devices used in conjunction within the AR environment, such as peripheral device 136 operatively paired with one or more HMDs, e.g., HMD 112. Although the techniques described herein are described with respect to time synchronization between a peripheral device 136 and one or more HMDs in an artificial reality system, the techniques may apply to any devices that may be operatively paired.

In the example of FIG. 1, the techniques provide time synchronization across various clock domains between HMD 112 and peripheral device 136. More specifically, and as further described below, the timing of HMD transceiver 142A is first synchronized to HMD 112, the timing of peripheral device transceiver 142B is then synchronized to HMD transceiver 142A, and then the timing of peripheral device 136 is synchronized to peripheral device transceiver 142B. In some examples, the timing of peripheral device transceiver 142B is first synchronized to peripheral device 136, the timing of HMD transceiver 142A is then synchronized to peripheral device transceiver 142B, and then the timing of HMD 112 is synchronized to HMD transceiver 142A.

In the example of FIG. 1A, to synchronize the timing of HMD transceiver 142A to HMD 112, HMD transceiver 142A sends an interrupt to HMD 112, and records a local time (e.g., a timestamp) of HMD transceiver 142A at the time HMD transceiver 142A sent the interrupt (referred to herein as "HMD transceiver timestamp"). The timestamps described herein may each be a Time Synchronized Function (TSF) timestamp that is a 64-bit timestamp with a minimum of 1 microsecond bit resolution (e.g., where Least Significant Bit (LSB) is 1 microsecond). That is each bit of the timestamp represents 1 microsecond. In these examples, wireless transceivers 142 may implement TSF and send TSF timestamps periodically to synchronize timing between the wireless transceiver. Additional examples of TSF is described in "IEEE 802.11-2016—IEEE Standard for Information technology—Telecommunications and information exchange between systems Local and metropolitan area networks—Specific requirements Part 11: Wireless LAN Medium Access Control (MAC) and Physical Layer (PHY) Specifications," IEEE, Dec. 14, 2014, the entire contents of which is incorporated by reference herein.

In response to receiving the interrupt, HMD 112 captures its local time (referred to herein as "HMD timestamp"), obtains the HMD transceiver timestamp to HMD 112, and computes a delta between the HMD timestamp and HMD transceiver timestamp. The delta represents the offset between the clock domain associated with wireless transceiver 142A and the clock domain associated with hardware of HMD 112. HMD 112 communicates the delta to HMD transceiver 142A for relay toward peripheral device 136.

The timing of wireless transceivers 142 are then synchronized. In this example, to synchronize timing between the wireless transceivers, HMD transceiver 142A transmits an HMD transceiver timestamp to peripheral device transceiver 142B. In some examples, the HMD transceiver sends the timestamp of the HMD transceiver that is adjusted for any transmission processing delays experienced by the HMD transceiver 142A before sending the timestamp to peripheral device transceiver 142B. For example, transmission processing delays occur from the time HMD transceiver 142A determines to send a timestamp to when the timestamp is sent via the antenna of HMD transceiver 142A. HMD transceiver 142A may first adjust the HMD transceiver timestamp that accounts for the transmission processing delays (e.g., adjust the timestamp forward) and then sends the adjusted HMD transceiver timestamp to peripheral device transceiver 142B. When peripheral device transceiver 142B receives the adjusted HMD transceiver timestamp, peripheral device transceiver 142B may further adjust the HMD transceiver timestamp for any receiving processing delays experienced by peripheral device transceiver 142B. For example, receiving processing delays occur from the time the antenna of peripheral device transceiver 142B receives the timestamp to when the timestamp is processed by peripheral device transceiver 142B. After receiving the timestamp from wireless transceiver 142A, peripheral device transceiver 142B subtracts the processing delay from the timestamp and updates a local clock of peripheral device transceiver 142B using the timestamp adjusted for processing delays. By adjusting the timestamp to account for any processing delays, the peripheral device transceiver 142B may adjust for any offset between wireless transceivers 142. Although the examples described herein describe synchronization of the wireless transceivers after the synchronization between HMD 112 and HMD transceiver 142A, the wireless transceivers may be synchronized prior to the synchronization between HMD 112 and HMD transceiver 142A, such as when wireless transceivers wake up for transmission.

Peripheral device transceiver 142B then sends an interrupt to peripheral device 136 and records the local time of peripheral device transceiver 142B (referred to herein as "peripheral device transceiver timestamp") at the time peripheral device transceiver 142B sent the interrupt. In response to receiving the interrupt, peripheral device 136 captures its local time (referred to herein as "peripheral device timestamp"), obtains the peripheral device transceiver timestamp, and computes a delta between the peripheral device timestamp and peripheral device transceiver timestamp. Peripheral device 136 then adjusts a local clock of peripheral device 136 using the delta, thereby synchronizing the timing of peripheral device 136 to the HMD 112. In this way, peripheral device 136 may adjust its local clock based on a plurality of offsets across clock domains, such as an offset between HMD 112 and wireless transceiver 142A, an offset between wireless transceivers 142, and an offset between wireless transceiver 142B and peripheral device 136.

Figure 1B:
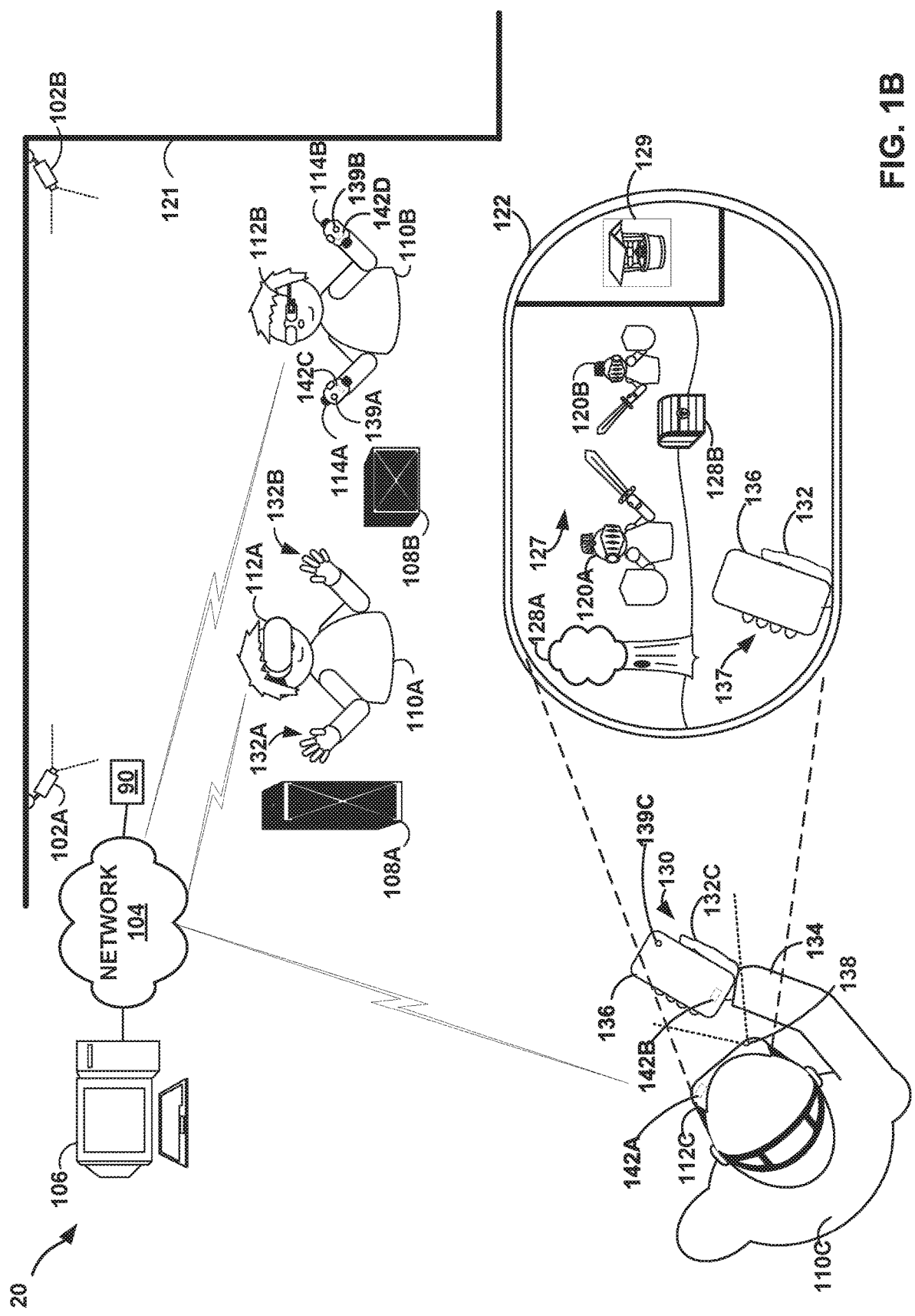
FIG. 1B is an illustration depicting another example of the artificial reality system that provides time synchronization across various clock domains of devices within a multi-device artificial reality system, in accordance with techniques described in this disclosure.

FIG. 1B is an illustration depicting another example artificial reality system 20 that provides time synchronization across various clock domains of devices within a multi-device artificial reality system, in accordance with the techniques described in this disclosure. Similar to artificial reality system 10 of FIG. 1A, in some examples, artificial reality system 20 of FIG. 1B may provide time synchronization between a plurality of AR devices, e.g., HMDs 112A-112C (collectively "HMDS 112"), controllers 114A and 114B (collectively, "controllers 114"), and/or peripheral device 136.

In the example of FIG. 1B, artificial reality system 20 includes external cameras 102A and 102B (collectively, "external cameras 102"), HMDs 112, controllers 114, console 106, and sensors 90. As shown in FIG. 1B, artificial reality system 20 represents a multi-user environment in which an artificial reality application executing on console 106 and/or HMDs 112 presents artificial reality content to each of users 110A-110C (collectively, "users 110") based on a current viewing perspective of a corresponding frame of reference for the respective user. That is, in this example, the artificial reality application constructs artificial content by tracking and computing pose information for a frame of reference for each of HMDs 112. Artificial reality system 20 uses data received from cameras 102, HMDs 112, and controllers 114 to capture 3D information within the real world environment, such as motion by users 110 and/or tracking information with respect to users 110 and objects 108, for use in computing updated pose information for a corresponding frame of reference of HMDs 112. As one example, the artificial reality application may render, based on a current viewing perspective determined for HMD 112C, artificial reality content 122 having virtual objects 128A-128B (collectively, "virtual objects 128") as spatially overlaid upon real world objects 108A-108B (collectively, "real world objects 108"). Further, from the perspective of HMD 112C, artificial reality system 20 renders avatars 120A, 120B based upon the estimated positions for users 110A, 110B, respectively.

Each of HMDs 112 concurrently operates within artificial reality system 20. In the example of FIG. 1B, each of users 110 may be a "player" or "participant" in the artificial reality application, and any of users 110 may be a "spectator" or "observer" in the artificial reality application. HMD 112C may operate substantially similar to HMD 112 of FIG. 1A by tracking hand 132 and/or arm 134 of user 110C and rendering the portions of hand 132 that are within field of view 130 as virtual hand 132 within artificial reality content 122. HMD 112B may receive user inputs from controllers 114 held by user 110B. In some examples, controller 114A and/or 114B can correspond to peripheral device 136 of FIG. 1A and operate substantially similar to peripheral device 136 of FIG. 1A. HMD 112A may also operate substantially similar to HMD 112 of FIG. 1A and receive user inputs in the form of gestures performed on or with peripheral device 136 by of hands 132A, 132B of user 110A. HMD 112B may receive user inputs from controllers 114 held by user 110B. Controllers 114 may be in communication with HMD 112B using near-field communication of short-range wireless communication such as Bluetooth, using wired communication links, or using other types of communication links.

In a manner similar to the examples discussed above with respect to FIG. 1A, console 106 and/or HMD 112C of artificial reality system 20 generates and renders a virtual surface comprising virtual content item 129 (e.g., GIF, photo, application, live-stream, video, text, web-browser, drawing, animation, 3D model, representation of data files (including two-dimensional and three-dimensional datasets), or any other visible media), which may be overlaid upon the artificial reality content 122 displayed to user 110C when the portion of wall 121 associated with virtual content item 129 comes within field of view 130 of HMD 112C. As shown in FIG. 1B, in addition to or alternatively to image data captured via camera 138 of HMD 112C, input data from external cameras 102 may be used to track and detect particular motions, configurations, positions, and/or orientations of peripheral device 136 and/or hands and arms of users 110, such as hand 132 of user 110C, including movements of individual and/or combinations of digits (fingers, thumb) of the hand.

In some aspects, the artificial reality application can run on console 106, and can utilize image capture devices 102A and 102B to analyze configurations, positions, and/or orientations of hand 132B to identify input gestures that may be performed by a user of HMD 112A. Similarly, HMD 112C can utilize image capture device 138 to analyze configurations, positions, and/or orientations of peripheral device 136 and hand 132C to input gestures that may be performed by a user of HMD 112C. In some examples, peripheral device 136 includes one or more sensors (e.g., accelerometers) for tracking motion or orientation of the peripheral device 136. The artificial reality application may render virtual content items and/or UI elements, responsive to such gestures, motions, and orientations, in a manner similar to that described above with respect to FIG. 1A.

Image capture devices 102 and 138 may capture images in the visible light spectrum, the infrared spectrum, or other spectrum. Image processing described herein for identifying objects, object poses, and gestures, for example, may include processing infrared images, visible light spectrum images, and so forth.

Devices of artificial reality system 20 may work in conjunction in the AR environment. For example, peripheral device 136 is operatively paired with HMD 112C to jointly operate within AR system 20 to provide an artificial reality experience. Similarly, controllers 114 are paired with HMD 112B to jointly operate within AR system 20. Peripheral device 136, HMDs 112, and controllers 114 may each include a wireless transceiver to send and receive data. For example, HMD 112B may include a wireless transceiver (not shown in FIG. 1B) to send and receive data from wireless transceivers 142C and 142D of controllers 139A and 139B, respectively. Similarly, HMD 112C may include wireless transceiver 142A to send and receive data from wireless transceiver 142B of peripheral device 136.

As one example, peripheral device 136 may capture audio or image samples using a media capture device, e.g., media capture device 139C, and use wireless transceiver 142B of peripheral device 136 to send the audio or image samples to wireless transceiver 142A of HMD 112C to be processed (e.g., for playback). Similarly, media capture devices 139A and 139B of controllers 114 may capture audio or image samples and use wireless transceivers 142C and 142D of controllers 114, respectively, to send the audio or image samples to a wireless transceiver (not shown in FIG. 1B) of HMD 112B to be processed for playback.

Similar to the example described in FIG. 1A, artificial reality system 20 may provide time synchronization across various clock domains of multiple devices used in conjunction within the AR environment. For example, the techniques provide time synchronization between HMD 112C and peripheral device 136 and/or between HMD 112B and controllers 114. More specifically, as further described below, the techniques provide time synchronization between wireless transceiver 142A and HMD 112C, between wireless transceiver 142A and wireless transceiver 142B of peripheral device 136, and between peripheral device 136 and wireless transceiver 142B. Similarly, the techniques provide time synchronization between the wireless transceiver of HMD 112B and HMD 112B, between a wireless transceiver of HMD 112B and wireless transceivers 142C and/or 142D of controllers 114, and between controllers 114 and wireless transceivers 142C and 142D of controllers 114.

Figure 2A:
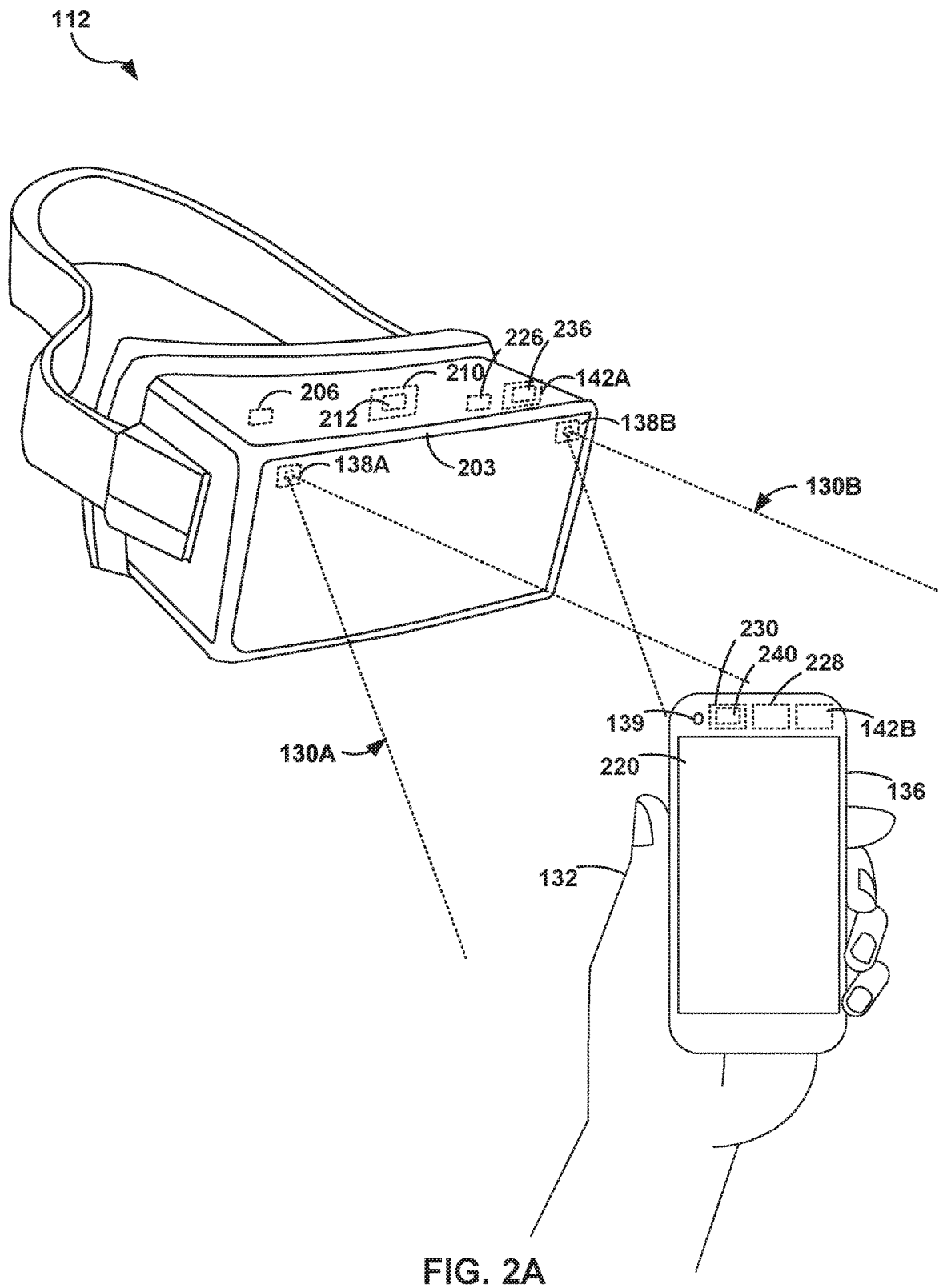
FIG. 2A is an illustration depicting an example HMD and an example peripheral device of the artificial reality system that provides time synchronization across various clock domains, in accordance with techniques described in this disclosure.

FIG. 2A is an illustration depicting an example HMD 112 and an example peripheral device 136 that provides time synchronization across various clock domains of devices within a multi-device artificial reality system, in accordance with the techniques described in this disclosure. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user. In other examples, HMD 112 may take the form of other wearable head mounted displays, such as glasses or goggles.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. More specifically, image capture devices 138 capture image data representative of objects (including peripheral device 136 and/or hand 132) in the physical environment that are within a field of view 130A, 130B of image capture devices 138, which typically corresponds with the viewing perspective of HMD 112. Although HMD 112 is illustrated as including an image capture device, HMD 112 may additionally, or alternatively, include one or more audio capture devices, such as microphones or the like.

HMD 112 includes an internal control unit 210, which may include an internal power source and one or more printed-circuit boards having one or more processors, memory, and hardware to provide an operating environment for executing programmable operations to process sensed data and present artificial reality content on display 203. In the example of FIG. 2A, control unit 210 includes processor 212 (referred to herein as "HMD processor 212") configured to compute a delta across various clock domains, as further described below.

In one example, control unit 210 is configured to, based on the sensed data (e.g., image data captured by image capture devices 138 and/or 102, position information from GPS sensors), generate and render for display on display 203 a virtual surface comprising one or more virtual content items (e.g., virtual content items 124, 126 of FIG. 1A) associated with a position contained within field of view 130A, 130B of image capture devices 138. As explained with reference to FIGS. 1A-1B, a virtual content item may be associated with a position within a virtual surface, which may be associated with a physical surface within a real-world environment, and control unit 210 can be configured to render the virtual content item (or portion thereof) for display on display 203 in response to a determination that the position associated with the virtual content (or portion therefore) is within the current field of view 130A, 130B. In some examples, a virtual surface is associated with a position on a planar or other surface (e.g., a wall), and control unit 210 will generate and render the portions of any virtual content items contained within that virtual surface when those portions are within field of view 130A, 130B.

In one example, control unit 210 is configured to, based on the sensed data, identify a specific gesture or combination of gestures performed by the user and, in response, perform an action. For example, in response to one identified gesture, control unit 210 may generate and render a specific user interface for display on electronic display 203 at a user interface position locked relative to a position of the peripheral device 136. For example, control unit 210 can generate and render a user interface including one or more UI elements (e.g., virtual buttons) on surface 220 of peripheral device 136 or in proximity to peripheral device 136 (e.g., above, below, or adjacent to peripheral device 136). Control unit 210 may perform object recognition within image data captured by image capture devices 138 to identify peripheral device 136 and/or a hand 132, fingers, thumb, arm or another part of the user, and track movements, positions, configuration, etc., of the peripheral device 136 and/or identified part(s) of the user to identify pre-defined gestures performed by the user. In response to identifying a pre-defined gesture, control unit 210 takes some action, such as selecting an option from an option set associated with a user interface (e.g., selecting an option from a UI menu), translating the gesture into input (e.g., characters), launching an application, manipulating virtual content (e.g., moving, rotating a virtual content item), generating and rendering virtual markings, generating and rending a laser pointer, or otherwise displaying content, and the like. For example, control unit 210 can dynamically generate and present a user interface, such as a menu, in response to detecting a pre-defined gesture specified as a "trigger" for revealing a user interface (e.g., turning peripheral device to a landscape or horizontal orientation (not shown)). In some examples, control unit 210 detects user input, based on the sensed data, with respect to a rendered user interface (e.g., a tapping gesture performed on a virtual UI element). In some examples, control unit 210 performs such functions in response to direction from an external device, such as console 106, which may perform object recognition, motion tracking and gesture detection, or any part thereof.

As an example, control unit 210 can utilize image capture devices 138A and 138B to analyze configurations, positions, movements, and/or orientations of peripheral device 136, hand 132 and/or arm 134 to identify a user interface gesture, selection gesture, stamping gesture, translation gesture, rotation gesture, drawing gesture, pointing gesture, etc., that may be performed by users with respect to peripheral device 136. The control unit 210 can render a UI menu (including UI elements) and/or a virtual surface (including any virtual content items) and enable the user to interface with that UI menu and/or virtual surface based on detection of a user interface gesture, selection gesture, stamping gesture, translation gesture, rotation gesture, and drawing gesture performed by the user with respect to the peripheral device, as described in further detail below.

In one example, surface 220 of peripheral device 136 is a presence-sensitive surface, such as a surface that uses capacitive, conductive, resistive, acoustic, or other technology to detect touch and/or hover input. In some examples, surface 220 of peripheral device 136 is a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen). In such an example, peripheral device 136 can render a user interface or other virtual elements (e.g., virtual markings) on touchscreen 220 and detect user input (e.g., touch or hover input) on touchscreen 220. In that example, peripheral device 136 can communicate any detected user input to HMD 112 (and/or console 106 of FIG. 1A) using wireless communications links (e.g., Wi-Fi, near-field communication of short-range wireless communication such as Bluetooth), using wired communication links (not shown), or using other types of communication links. In some examples, peripheral device can include one or more input devices (e.g., buttons, trackball, scroll wheel) for interacting with virtual content (e.g., to select a virtual UI element, scroll through virtual UI elements).

In some examples, peripheral device 136 may include one or more media capture devices 139. Media capture devices 139 may represent one or more image capture devices such as video cameras, laser scanners, Doppler radar scanners, depth scanners, or the like, configured to output image data representative of the physical environment. Alternatively, or additionally, or alternatively, media capture devices 139 may represent one or more audio capture devices, such as a microphone, or other transducers to capture audio signals and converts the audio signals into electronic signals.

HMD 112 includes a clock domain associated with one or more processors and hardware of HMD 112. In this example, HMD 112 includes system clock 226 that provides clocking signals for one or more processors (e.g., processor 212) and hardware of HMD 112, such as image capture devices 138. For example, processor 212 may use system clock 226 to control the frequency at which to capture or process audio or image samples. Similarly, peripheral device 136 includes a clock domain for one or more processors and hardware of peripheral device 136. In this example, peripheral device 136 includes system clock 230 that provides clocking signals for one or more processors (e.g., processor 228) and hardware of peripheral device 136, such as media capture device 139. Processor 228 may use system clock 230 to control the frequency at which to capture or process audio or image samples.

HMD 112 and peripheral device 136 also includes a clock domain for wireless transceivers, e.g., wireless transceivers 142A and 142B. For example, wireless transceiver 142A includes clock 236 that provides a clocking signal for wireless transceiver 142A. Similarly, wireless transceiver 142B includes clock 240 that provides a clocking signal for wireless transceiver 142B.

System clocks 226 and 230, and wireless transceiver clocks 236 and 240, may each generate clocking signals using one or more oscillators. For example, the clocks may generate a clocking signal based on a high-frequency oscillator (e.g., 38.4 or 24 MHz) or based on a low-frequency oscillator (e.g., 32.768 kHz). In some examples, system clocks 226 and 230, and wireless transceiver clocks 236 and 240, may generate clocking signals using the high-frequency oscillator when devices are not in low-power mode, and generate clocking signals using a low-frequency oscillator when in low-power mode.

In accordance with the techniques described herein, to synchronize the timing of HMD 112 and peripheral device 136 across various clock domains of the devices, the techniques may first synchronize the timing between HMD transceiver 142A and HMD 112, then synchronize the timing between the HMD transceiver 142A and a peripheral device transceiver 142B, and then synchronize the timing between the peripheral device 136 and peripheral device transceiver 142B.

Similar to the example described in FIGS. 1A and 1B, to synchronize the timing of HMD transceiver 142A with HMD 112, HMD transceiver 142A generates and sends an interrupt to HMD 112 and records a local time of clock 236 of HMD transceiver 142A ("HMD transceiver timestamp") at the time HMD transceiver 142A sent the interrupt. In response to receiving the interrupt, HMD 112 captures a local time of system clock 226 ("HMD timestamp"), obtains the HMD transceiver timestamp, and computes a delta between the HMD timestamp and the HMD transceiver timestamp. HMD 112 communicates the delta to HMD transceiver 142A, which in turn sends the delta toward peripheral device 136. For example, a driver (not shown in the example of FIG. 5A) of HMD 112 may send a message including the delta to HMD transceiver 142A.

The peripheral device transceiver 142B then synchronizes to the HMD transceiver 142A. For example, HMD transceiver 142A may transmit the HMD transceiver timestamp, including adjustments for transmission processing delays, to the peripheral device transceiver 142B, which further adjusts the timestamp to account for any receiving processing delays and adjusts clock 240 using the adjusted timestamp.

Finally, peripheral device transceiver 142B generates and sends an interrupt to the peripheral device 136 and records the local time of clock 240 of peripheral device transceiver 142B ("peripheral device transceiver timestamp") at the time peripheral device transceiver 142B sent the interrupt. In response to receiving the interrupt, peripheral device 136 captures its local time of clock 230 ("peripheral device timestamp"), obtains the peripheral device transceiver timestamp, and computes the delta between the peripheral device timestamp and the peripheral device transceiver timestamp. Peripheral device 136 adjusts clock 230 of peripheral device 136 using the delta received from HMD 112 and the delta computed between the peripheral device timestamp and the peripheral device transceiver timestamp. In this way, to compensate for the drift occurring between clocks generating a clocking signal using a low-frequency oscillator, devices maintain the offset among the various clock domains, and adjust the clock of the devices based on the offset.

Figure 2B:
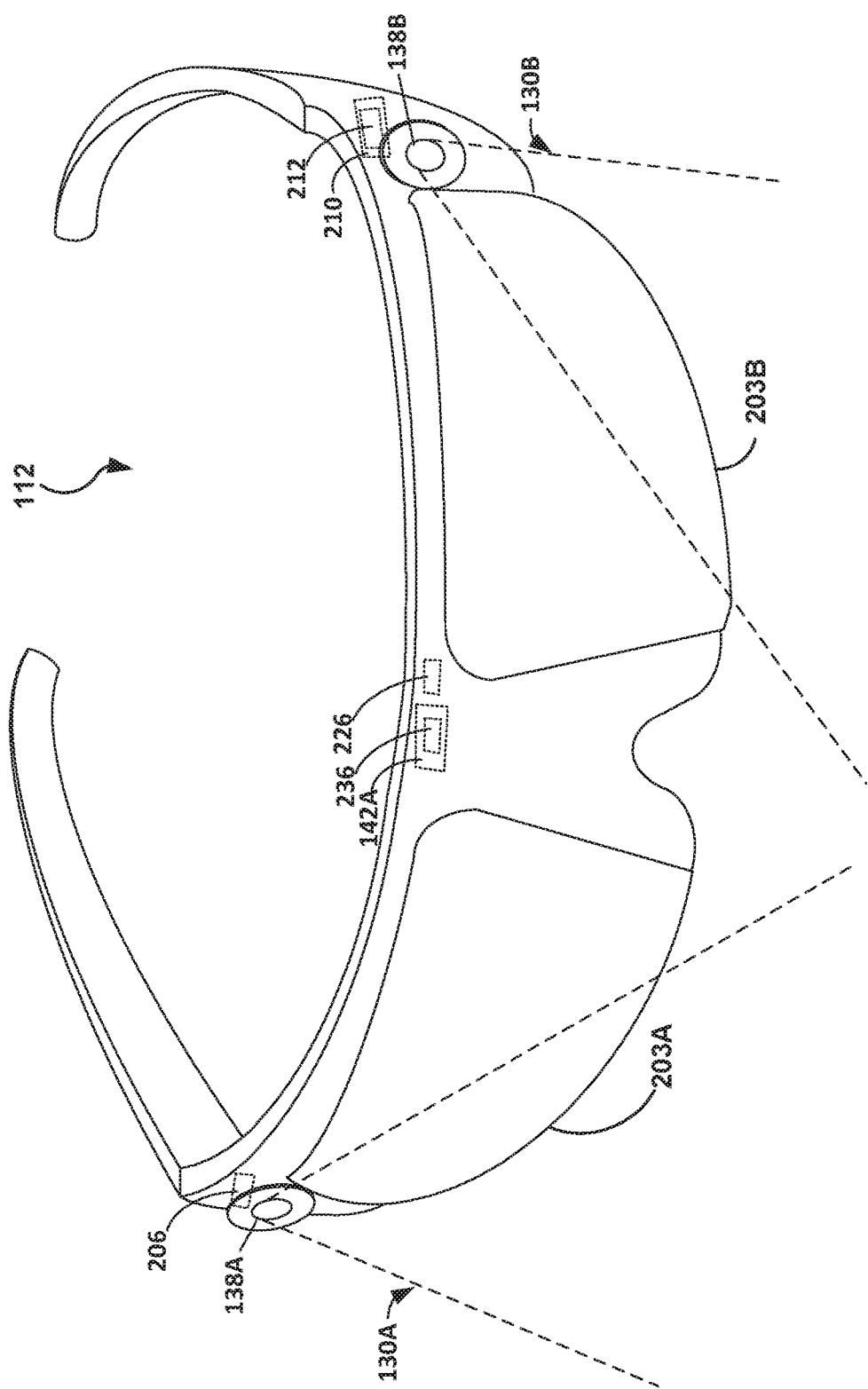
FIG. 2B is an illustration depicting another example HMD that provides time synchronization across various clock domains of devices within a multi-device artificial reality system, in accordance with the techniques described in this disclosure.

FIG. 2B is an illustration depicting another example HMD 112 that provides time synchronization between devices within a multi-device Artificial Reality (AR) system, in accordance with the techniques described in this disclosure. As shown in FIG. 2B, HMD 112 may take the form of glasses. HMD 112 of FIG. 2A may be an example of any of HMDs 112 of FIGS. 1A and 1B. HMD 112 may be part of an artificial reality system, such as artificial reality systems 10, 20 of FIGS. 1A, 1B, or may jointly operate with one or more other devices of an artificial reality system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2B includes interior-facing electronic displays 203A and 203B (collectively, "electronic displays 203") configured to present artificial reality content to the user. Electronic displays 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In the example shown in FIG. 2B, electronic displays 203 form a stereoscopic display for providing separate images to each eye of the user. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user.

As further shown in FIG. 2B, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. HMD 112 includes an internal control unit 210, which may include an internal power source and one or more printed-circuit boards having one or more processors, memory, and hardware to provide an operating environment for executing programmable operations to process sensed data and present artificial reality content on display 203. In the example of FIG. 2B, control unit 210 includes processor 212 configured to maintain an offset among the various clock domains, as further described below.

Similar to the example illustrated in FIG. 2A, HMD 112 includes system clock 226 to generate clocking signals at various frequencies provided by oscillators. HMD 112 may use system clock 226 as a timing reference for image (or in some instances audio) capture or playback. For example, HMD 112 may receive image samples from a peripheral device 136 via wireless transceiver 142A and use system clock 226 as a reference clock to process the image samples at a specific frequency (e.g., the frequency at which the image samples were captured) for playback on electronic displays 203. Alternatively, or additionally, HMD 112 may use system clock 226 as a timing reference for image capture devices 138 to capture image samples at a specific frequency.

Wireless transceiver 142A includes clock 236 to wirelessly communicate with devices of the AR system, e.g., peripheral device 136. Clock 236 of wireless transceiver 142A may synchronize with a wireless receiver of peripheral device 136 to send and/or receive the image samples, for example.

Similar to the example described in FIG. 2A, to synchronize the timing between HMD transceiver 142A and HMD 112, HMD transceiver 142A generates and sends an interrupt to a processor of HMD 112 and records the local time of clock 236 of HMD transceiver 142A. When HMD 112 receives the interrupt, HMD 112 captures the local time of clock 226, obtains a timestamp of HMD transceiver 142A, and computes a delta between the timestamps of HMD 112 and HMD transceiver 142A. HMD 112 communicates the delta to HMD transceiver 142A, which in turn sends the delta toward peripheral device 136.

To synchronize timing with another wireless transceiver (e.g., wireless transceiver 142B of peripheral device 136), HMD transceiver 142A transmits a timestamp adjusted for any transmission processing delays to wireless transceiver 142B of peripheral device 136.

Figure 3:
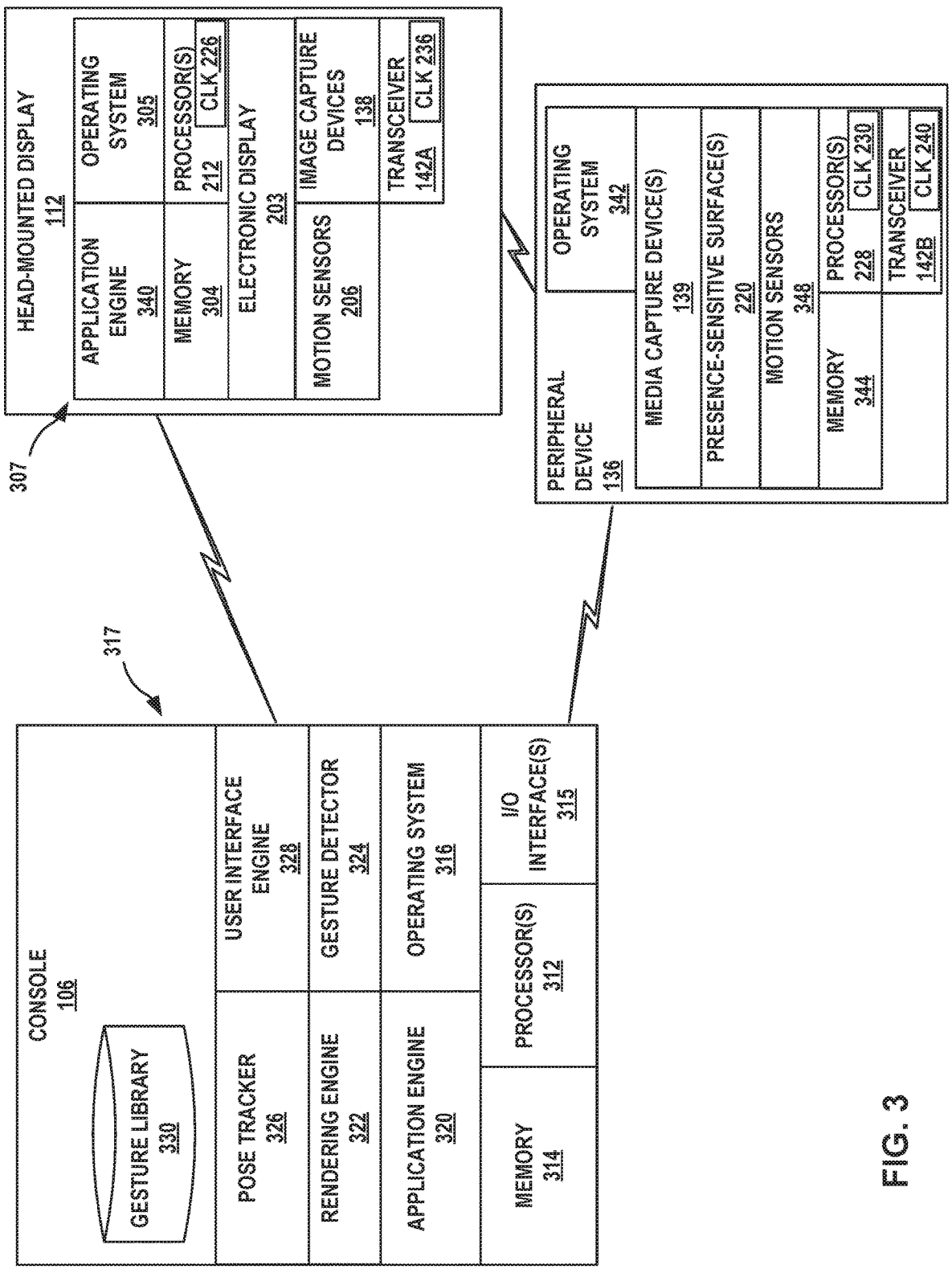
FIG. 3 is a block diagram showing example implementations of a console, an HMD, and a peripheral device of the multi-device artificial reality systems of FIGS. 1A, 1B, in accordance with techniques described in this disclosure.

FIG. 3 is a block diagram showing example implementations of console 106, HMD 112, and peripheral device 136 of multi-device artificial reality system 10, 20 of FIGS. 1A, 1B, in accordance with techniques described in this disclosure. In the example of FIG. 3, console 106 performs pose tracking, gesture detection, and user interface and virtual surface generation and rendering for HMD 112 based on sensed data, such as motion data and image data received from HMD 112 and/or external sensors.

In this example, HMD 112 includes one or more processors 212 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 307, including application engine 340. As discussed with respect to the examples of FIGS. 2A and 2B, processors 212 are coupled to electronic display 203, motion sensors 206 and image capture devices 138. In some examples, processors 212 and memory 304 may be separate, discrete components. In other examples, memory 304 may be on-chip memory collocated with processors 212 within a single integrated circuit.

As discussed with respect to the example of FIGS. 2A and 2B, HMD 112 includes a system clock domain associated with the timing of processors and hardware of HMD 112. For example, HMD processors 212 uses system clock 226 to govern the speed at which image capture devices 138 capture image samples, motion sensors 206 track motion (e.g., acceleration), and/or processing of image samples for playback on electronic display 203, etc.

HMD 112 includes HMD transceiver 142A to send and/or receive data (e.g., audio or image samples) from another device of the artificial reality system, such as peripheral device 136. For example, HMD transceiver 142A may send image samples to peripheral device 136 using wireless transceiver 142A or receive image samples from peripheral device transceiver 142B.

In these examples, HMD processor 212 may first synchronize timing between system clock 226 of HMD 112 and clock 236 of HMD transceiver 142A. For example, HMD transceiver 142A sends an interrupt to HMD processor 212 and records the local time of clock 236 of HMD transceiver 142A. In response to receiving the interrupt, HMD processor 212 captures the local time of system clock 226 of HMD 112. HMD processor 212 obtains the timestamp of clock 236 of HMD transceiver 142A and computes a delta between the timestamps of system clock 226 and clock 236. HMD 112 communicates the delta to HMD transceiver 142A, which in turn sends the delta toward peripheral device 136.

To synchronize timing with another wireless transceiver (e.g., wireless transceiver 142B of peripheral device 136), HMD transceiver 142A transmits a timestamp adjusted for any transmission processing delays to a transceiver of another device of the artificial reality system, e.g., peripheral device transceiver 142B of peripheral device 136.

In general, console 106 is a computing device that processes image and tracking information received from cameras 102 (FIG. 1B) and/or image capture devices 138 of HMD 112 (FIGS. 1A, 2A, 2B) to perform gesture detection and user interface and/or virtual content generation for HMD 112. In some examples, console 106 is a single computing device, such as a workstation, a desktop computer, a laptop, or gaming system. In some examples, at least a portion of console 106, such as processors 312 and/or memory 314, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 3, console 106 includes one or more processors 312 and memory 314 that, in some examples, provide a computer platform for executing an operating system 316, which may be an embedded, real-time multitasking operating system, for instance, or other type of operating system. In turn, operating system 316 provides a multitasking operating environment for executing one or more software components 317. Processors 312 are coupled to one or more I/O interfaces 315, which provides one or more I/O interfaces for communicating with external devices, such as a keyboard, game controllers, display devices, image capture devices, HMDs, peripheral devices, and the like. Moreover, the one or more I/O interfaces 315 may include one or more wired or wireless network interface controllers (NICs) for communicating with a network, such as network 104.

Software applications 317 of console 106 operate to provide an overall artificial reality application. In this example, software applications 317 include application engine 320, rendering engine 322, gesture detector 324, pose tracker 326, and user interface engine.

In general, application engine 320 includes functionality to provide and present an artificial reality application, e.g., a teleconference application, a gaming application, a navigation application, an educational application, training or simulation applications, and the like. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Application engine 320 and rendering engine 322 construct the artificial content for display to user 110 in accordance with current pose information for a frame of reference, typically a viewing perspective of HMD 112, as determined by pose tracker 326. Based on the current viewing perspective, rendering engine 322 constructs the 3D, artificial reality content which may in some cases be overlaid, at least in part, upon the real-world 3D environment of user 110. During this process, pose tracker 326 operates on sensed data received from HMD 112, such as movement information and user commands, and, in some examples, data from any external sensors 90 (FIGS. 1A, 1B), such as external cameras, to capture 3D information within the real-world environment, such as motion by user 110 and/or feature tracking information with respect to user 110. Based on the sensed data, pose tracker 326 determines a current pose for the frame of reference of HMD 112 and, in accordance with the current pose, constructs the artificial reality content for communication, via the one or more I/O interfaces 315, to HMD 112 for display to user 110.

Pose tracker 326 may determine a current pose for peripheral device 136 and, in accordance with the current pose, triggers certain functionality associated with any rendered virtual content (e.g., places a virtual content item onto a virtual surface, manipulates a virtual content item, generates and renders one or more virtual markings, generates and renders a laser pointer). In some examples, pose tracker 326 detects whether the HMD 112 is proximate to a physical position corresponding to a virtual surface (e.g., a virtual pinboard), to trigger rendering of virtual content.

User interface engine 328 is configured to generate virtual user interfaces for rendering in an artificial reality environment. User interface engine 328 generates a virtual user interface to include one or more virtual user interface elements, such as a virtual drawing interface, a selectable menu (e.g., drop-down menu), virtual buttons, a directional pad, a keyboard, or other user-selectable user interface elements, glyphs, display elements, content, user interface controls, and so forth. Rendering engine 322 is configured to render, based on a current pose for peripheral device 136, the virtual user interface at a user interface position, in the artificial reality environment, that is locked relative to a position of peripheral device 136 in the artificial reality environment. The user interface position may be a position of one of presence-sensitive surfaces 220, and rendering engine 322 may scale, rotate, and otherwise transform the virtual user interface to apply projection to match the pose, size, and perspective of the presence-sensitive surface 220 such that the virtual user interface appears, in the artificial reality environment, to be overlaid on the presence-sensitive surface 220. User interface engine 328 may generate virtual user interface to be partially transparent, allowing presence-sensitive surface 220 to be seen by the user. This degree of transparency may be configurable.

Console 106 may output this virtual user interface and other artificial reality content, via a communication channel, to HMD 112 for display at HMD 112. Rendering engine 322 receives pose information for peripheral device 136 to continually update the user interface position and pose to match that of the peripheral device 136, such as that of one of presence-sensitive surfaces 220.

Based on the sensed data from any of the image capture devices 138 or 102, presence-sensitive surfaces 220, or other sensor devices, gesture detector 324 analyzes the tracked motions, configurations, positions, and/or orientations of peripheral device 136 and/or objects (e.g., hands, arms, wrists, fingers, palms, thumbs) of the user to identify one or more gestures performed by user 110. More specifically, gesture detector 324 analyzes objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. In some examples, gesture detector 324 may track movement, including changes to position and orientation, of the peripheral device 136, hand, digits, and/or arm based on the captured image data, and compare motion vectors of the objects to one or more entries in gesture library 330 to detect a gesture or combination of gestures performed by user 110. In some examples, gesture detector 324 may receive user inputs detected by presence-sensitive surface(s) of peripheral device and process the user inputs to detect one or more gestures performed by user 110 with respect to peripheral device 136.

Gesture detector 324 and gesture library 330 may be distributed, in whole or in part, to peripheral device 136 to process user inputs on peripheral device 136 to detect gestures. In such cases, presence-sensitive surface(s) 220 detects user inputs at locations of the surface. Peripheral device 136 executing gesture detector 324 can process the user inputs to detect one or more gestures of gesture library 330. Peripheral device 136 may send indications of the detected gestures to console 106 and/or HMD 112 to cause the console 106 and/or HMD 112 to responsively perform one or more actions. Peripheral device 136 may alternatively, or additionally, send indications of the user inputs at locations of the surface to console 106, and gesture detector 324 may process the user inputs to detect one or more gestures of gesture library 330.

Some entries in gesture library 330 may each define a gesture as a series or pattern of motion, such as a relative path or spatial translations and rotations of peripheral device 136, a user's hand, specific fingers, thumbs, wrists and/or arms. Some entries in gesture library 330 may each define a gesture as a configuration, position, and/or orientation of the peripheral device, user's hand and/or arms (or portions thereof) at a particular time, or over a period of time. Some entries in gesture library 330 may each define a gesture as one or more user inputs, over time, detected by presence-sensitive surface(s) 220 of peripheral device 136. Other examples of type of gestures are possible. In addition, each of the entries in gesture library 330 may specify, for the defined gesture or series of gestures, conditions that are required for the gesture or series of gestures to trigger an action, such as spatial relationships to a current field of view of HMD 112, spatial relationships to the particular region currently being observed by the user, as may be determined by real-time gaze tracking of the individual, types of artificial content being displayed, types of applications being executed, and the like.

Each of the entries in gesture library 330 further may specify, for each of the defined gestures or combinations/series of gestures, a desired response or action to be performed by software applications 317. For example, certain specialized gestures may be pre-defined such that, in response to detecting one of the pre-defined gestures, user interface engine 328 dynamically generates a user interface as an overlay to artificial reality content being displayed to the user, thereby allowing the user 110 to easily invoke a user interface for configuring HMD 112 and/or console 106 even while interacting with artificial reality content. In other examples, certain gestures may be associated with other actions, such as providing input, selecting virtual objects (including virtual content items and/or UI elements), translating (e.g., moving, rotating) virtual objects, altering (e.g., scaling, annotating) virtual objects, making virtual markings, launching applications, and the like.

As an example, gesture library 330 may include entries that describe a peripheral device gesture, such as user interface activation gesture, a menu scrolling gesture, a selection gesture, a stamping gesture, a translation gesture, rotation gesture, drawing gesture, and/or pointing gesture. Gesture detector 324 may process image data from image capture devices 138 to analyze configurations, positions, motions, and/or orientations of peripheral device 136 and/or a user's hand to identify a user interface gesture, selection gesture, stamping gesture, translation gesture, rotation gesture, drawing gesture, pointing gesture, etc. that may be performed by users with respect to peripheral device 136. For example, the rendering engine 322 can render a pinboard user interface based on detecting, by the gesture detector 324, of the user interface gesture being performed and detecting, by the pose tracker 326, that the HMD 112 is proximate to a physical position corresponding to a virtual position of the virtual pinboard. The user interface engine 328 can define the menu that is displayed and can control actions that are performed in response to selections caused by selection gestures.

In the example shown in FIG. 3, peripheral device 136 includes one or more processors 228 and memory 344 that, in some examples, provide a computer platform for executing an operating system 342, which may be an embedded, real-time multitasking operating system, for instance, or other type of operating system. In turn, operating system 346 provides a multitasking operating environment for executing one or more software components. In some examples, peripheral device 136 includes one or more presence-sensitive surfaces 220 (e.g., one or more surfaces that use capacitive, conductive, resistive, acoustic, and/or other technology to detect touch and/or hover input). In one or more aspects, peripheral device 136 can be configured to detect touch and/or hover input at presence-sensitive surface 220, process that input (e.g., at processors 228) and communicate the touch and/or hover input and communicate information about that input (including location information about that input) to console 106 and/or HMD 112. As further shown in FIG. 3, in this example, peripheral device 136 further includes one or more motion sensors 348, such as one or more accelerometers (also referred to as IMUs) that output data indicative of current acceleration of peripheral device 136, GPS sensors that output data indicative of a location or position of peripheral device, radar or sonar that output data indicative of distances of peripheral device 136 from various objects (e.g., from a wall or other surface), or other sensors that provide indications of a location, position, and/or orientation of peripheral device or other objects within a physical environment. In some examples, processors 228 and memory 344 may be separate, discrete components. In other examples, memory 344 may be on-chip memory collocated with processors 228 within a single integrated circuit. In one or more aspects, peripheral device 136 can coexist with the HMD and, in some example, operate as an auxiliary input/output device for the HMD in the virtual environment. In some examples, the peripheral device 136 may operate as an artificial reality co-processing device to which some of the functions of the HMD are offloaded. In one or more aspects, peripheral device 136 can be a smartphone, tablet, or other hand-held device.

Media capture devices 139 of peripheral device 136 may capture audio or image samples. Media capture devices 139 may include video cameras, laser scanners, Doppler radar scanners, depth scanners, or the like, configured to output image data representative of the physical environment. Peripheral device 136 may additionally, or alternatively, include one or more audio capture devices, such as microphones or the like.

As discussed with respect to the example of FIGS. 2A and 2B, peripheral device 136 includes a system clock domain for the timing of processors and hardware of peripheral device 136. For example, processors 218 of peripheral device 136 use system clock 230 to govern the speed at which media capture devices 139 capture audio or image samples, motion sensors 348 track motion (e.g., acceleration), and/or processing of images on presence-sensitive surfaces 220, etc.

Peripheral device 136 includes peripheral device transceiver 142B to send and/or receive data (e.g., audio or image samples) from another device of the artificial reality system, such as HMD 112. For example, peripheral device transceiver 142B may send image samples to HMD transceiver 142A.

Wireless transceivers 142 are then synchronized. For example, to synchronize timing between wireless transceivers 142, peripheral device transceiver 142B may receive a timestamp from HMD transceiver 142A adjusted for any transmission processing delays. Peripheral device transceiver 142B further adjusts the timestamp for any receiving processing delays and adjusts clock 240 of peripheral device transceiver 142B using the adjusted timestamp.

Assuming that the timing between wireless transceivers 142 are synchronized, peripheral device processor 228 may synchronize timing between system clock 230 of peripheral device 136 and clock 240 of peripheral device transceiver 142B. For example, peripheral device transceiver 142B generates an interrupt to peripheral device processor 228 and records a local time of clock 240 of peripheral device transceiver 142B. When peripheral device processor 228 receives the interrupt, the peripheral device processor 228 captures the local time of system clock 230 of peripheral device 136, computes a delta between the timestamps of system clock 230 of peripheral device 136 and clock 240 of peripheral device transceiver 142B, and adjusts system clock 230 of peripheral device 136 using the delta received from HMD 112 and the delta computed between the timestamps of system clock 230 of peripheral device 136 and clock 240 of peripheral device transceiver 142B.

In some examples, each of processors 212, 228, 312 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 314, 344 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory. In some examples, peripheral device 136 may include a low pass filter to filter out any jitter that may occur from the wireless transmission.

Figure 4:
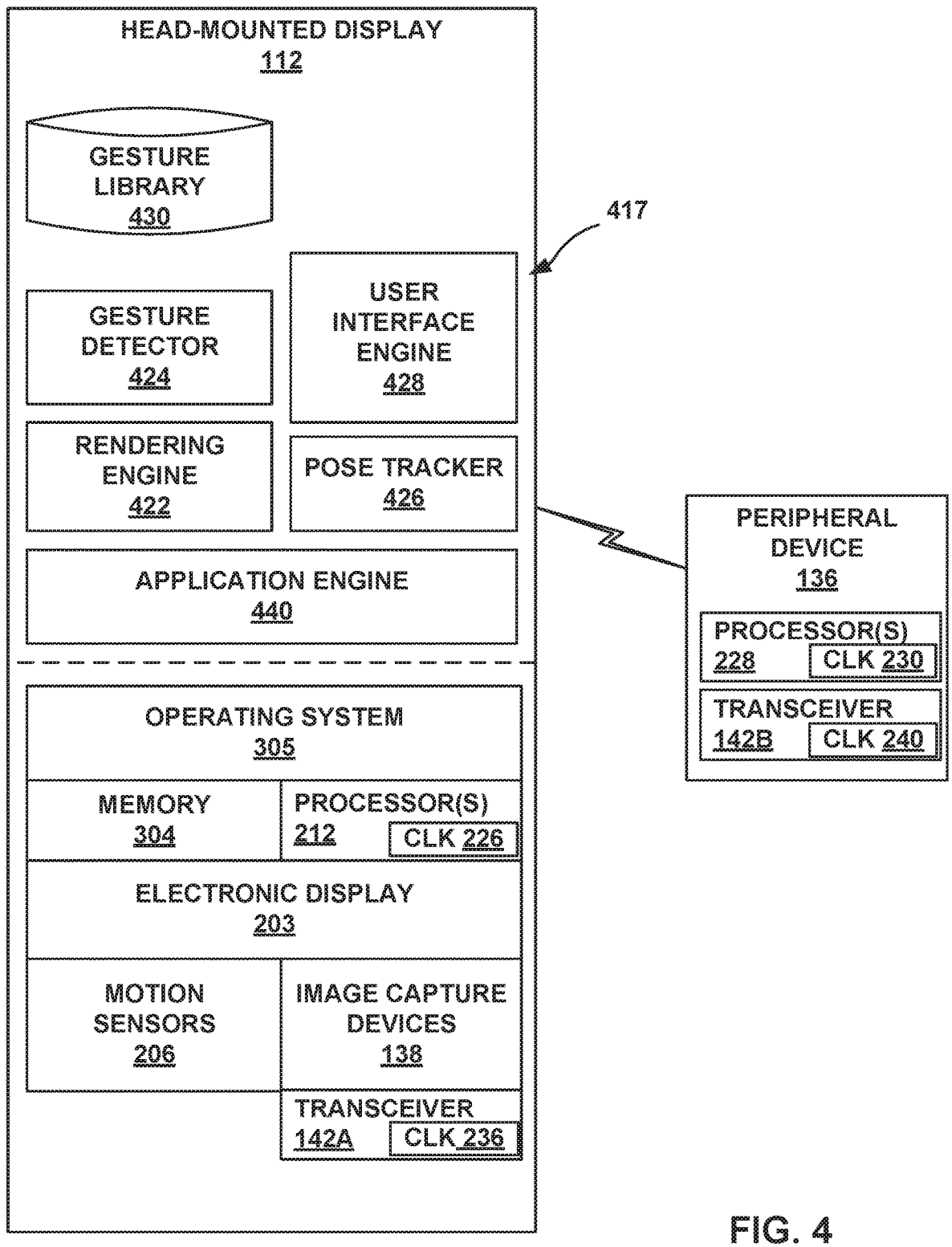
FIG. 4 is a block diagram depicting an example in which time synchronization across various clock domains of devices within a multi-device artificial reality system is performed by the HMD of the artificial reality systems of FIGS. 1A, 1B, in accordance with the techniques described in this disclosure.

FIG. 4 is a block diagram depicting an example in which time synchronization between devices within a multi-device Artificial Reality (AR) system is performed by HMD 112 of the artificial reality systems of FIGS. 1A, 1B in accordance with the techniques described in this disclosure.

In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 417. Moreover, processor(s) 302 are coupled to electronic display 203, motion sensors 206, and image capture devices 138.

In the example of FIG. 4, software components 417 operate to provide an overall artificial reality application. In this example, software applications 417 include application engine 440, rendering engine 422, gesture detector 424, pose tracker 426, and user interface engine 428. In various examples, software components 417 operate similar to the counterpart components of console 106 of FIG. 3 (e.g., application engine 320, rendering engine 322, gesture detector 324, pose tracker 326, and user interface engine 328) to construct virtual user interfaces overlaid on, or as part of, the artificial content for display to user 110.

Similar to the examples described with respect to FIG. 3, based on the sensed data from any of the image capture devices 138 or 102, presence-sensitive surfaces of peripheral device 136, or other sensor devices, gesture detector 424 analyzes the tracked motions, configurations, positions, and/or orientations of peripheral device 136 and/or objects (e.g., hands, arms, wrists, fingers, palms, thumbs) of the user to identify one or more gestures performed by user 110.

More specifically, gesture detector 424 may analyze objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. A virtual surface application generates virtual surfaces as part of, e.g., overlaid upon, the artificial reality content to be displayed to user 110 and/or performs actions based on one or more gestures or combinations of gestures of user 110 detected by gesture detector 424. Gesture detector 424 may analyze objects recognized within image data captured by image capture devices 138 of HMD 112 and/or sensors 90 and external cameras 102 to identify peripheral device 136 and/or a hand and/or arm of user 110, and track movements of the peripheral device 136, hand, and/or arm relative to HMD 112 to identify gestures performed by user 110. In some examples, gesture detector 424 may track movement, including changes to position and orientation, of the peripheral device 136, hand, digits, and/or arm based on the captured image data, and compare motion vectors of the objects to one or more entries in gesture library 430 to detect a gesture or combination of gestures performed by user 110. In some examples, gesture detector 424 may receive user inputs detected by presence-sensitive surface(s) of peripheral device and process the user inputs to detect one or more gestures performed by user 110 with respect to peripheral device 136. Gesture library 430 is similar to gesture library 330 of FIG. 3. Some of all of the functionality of gesture detector 424 may be executed by peripheral device 136.

As discussed with respect to the example of FIG. 3, HMD 112 includes HMD processor 212 to maintain the offset among various clock domains. For example, HMD processor 212 may first synchronize timing between system clock 226 of HMD 112 and clock 236 of HMD transceiver 142A. For example, HMD transceiver 142A generates an interrupt to HMD processor 212 and records the local time of clock 236 of HMD transceiver 142A. In response to receiving the interrupt, HMD processor 212 captures the local time of system clock 226 of HMD 112, obtains the timestamp of clock 236 of HMD transceiver 142A, and computes a delta between the timestamps of system clock 226 of HMD 112 and clock 236 of HMD transceiver 142A. HMD processor 212 communicates the delta to HMD transceiver 142A, which adjusts clock 236 of HMD transceiver 142A using the delta. The HMD transceiver 142A then transmits a timestamp (adjusted for any transmission delays) to a transceiver of another device of the artificial reality system (e.g., peripheral device 136), to synchronize the timing of the wireless transceivers, where the timing of peripheral device 136 is then synchronized with the timing of wireless transceiver 142B.

Figure 5A:
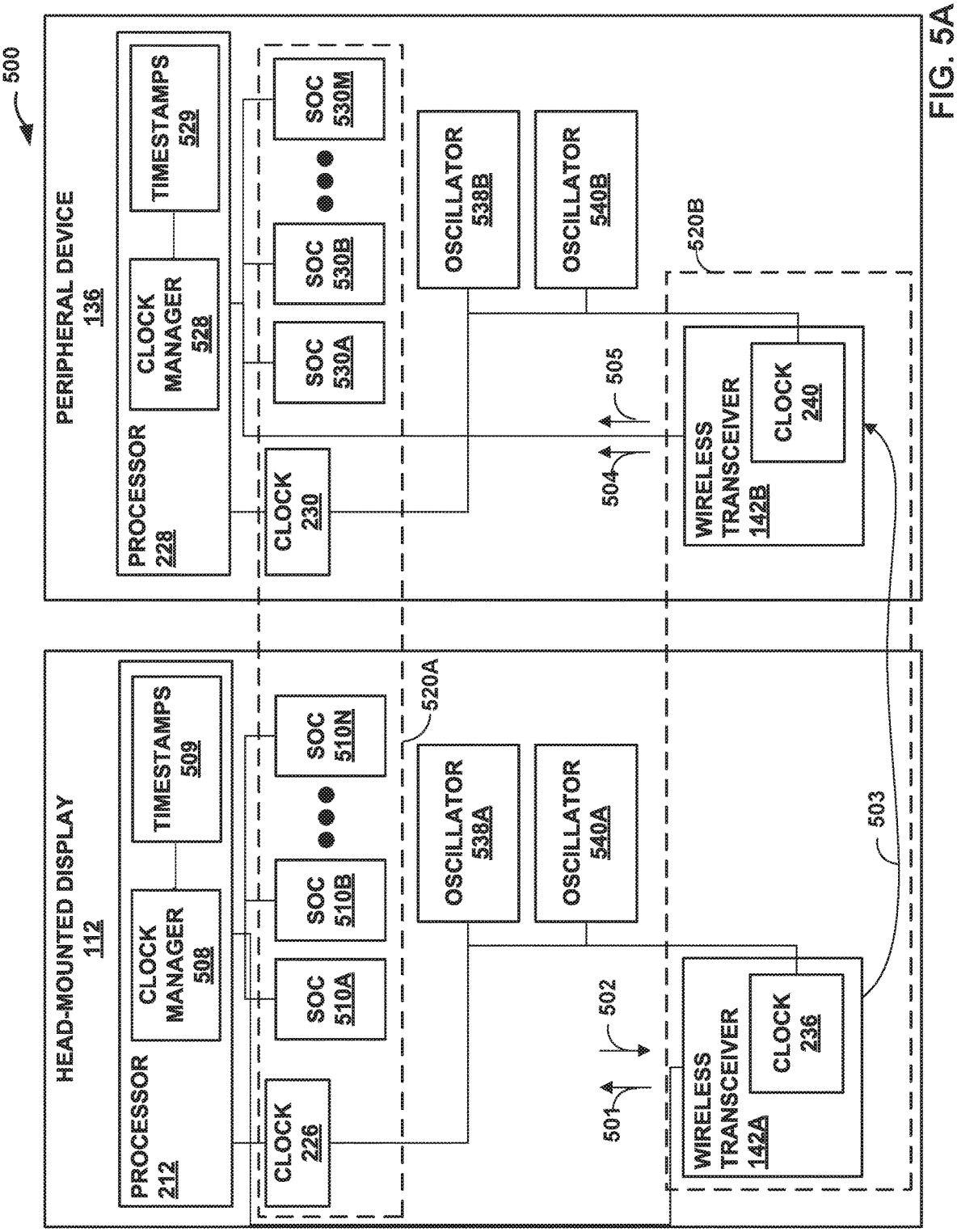
FIG. 5A is a block diagram showing an example implementation for a multi-device artificial reality system that provides time synchronization across various clock domains of devices within a multi-device artificial reality system, in accordance with the techniques described in this disclosure.

FIG. 5A is a block diagram showing an example implementation for a multi-device artificial reality system configured to provide time synchronization between the devices, in accordance with the techniques described in this disclosure. HMD 112 may be an example of any of HMDs 112 of FIGS. 1A-4. HMD 112 may be part of an artificial reality system, such as artificial reality systems 10, 20 of FIGS. 1A, 1B, or may operate as a stand-alone, mobile artificial reality system configured to implement the techniques described herein. Although the example described in FIG. 5A is described with respect to HMD 112 and peripheral device 136, the techniques described in this disclosure is applicable to any devices of an artificial reality system that are operatively paired.

Figure 6:
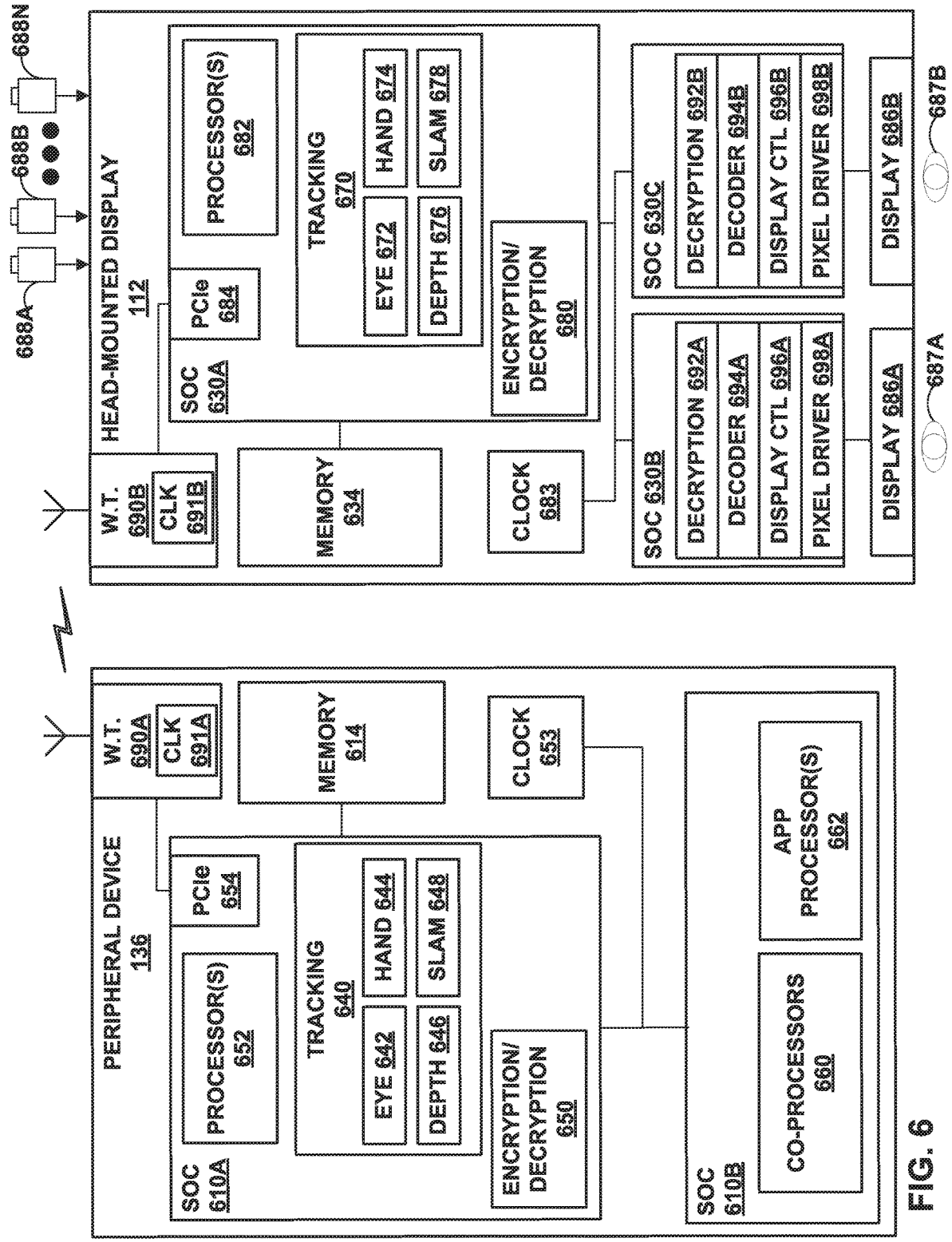
FIG. 6 is a block diagram illustrating a more detailed example implementation of a distributed architecture for a multi-device artificial reality system in which one or more devices (e.g., peripheral device and HMD) are implemented using one or more SoC integrated circuits within each device, in accordance with the techniques described in this disclosure.

In this example, one or more devices of the AR system (e.g., HMD 112 and peripheral device 136) are implemented using one or more System-on-a-Chip (SoC) integrated circuits. In general, SoCs 510, 530 represent a collection of specialized integrated circuits arranged in a distributed architecture and configured to provide an operating environment for artificial reality applications. As examples, SoC integrated circuits may include specialized functional blocks operating as co-application processors, sensor aggregators, encryption/decryption engines, security processors, hand/eye/depth tracking and pose computation elements, video encoding and rendering engines, display controllers and communication control components. A more detailed example is shown in FIG. 6. In this example, HMD 112 includes SoCs 510A-510N (collectively, "HMD SoCs 510") and peripheral device 136 includes SoCs 530A-530M (collectively, "peripheral device SoCs 530").

HMD SoCs 510 may be operatively paired with peripheral device SoCs 530 to jointly operate within an artificial reality system to provide an artificial reality experience. For example, peripheral device SoC 530A may be an integrated circuit for capturing image or audio samples using a media capture device. Similarly, peripheral device SoCs 530B may be an integrated circuit for processing image or audio samples for playback on a display.

HMD 112 may wirelessly communicate with peripheral device 136 using wireless transceiver 142A. Similarly, peripheral device 136 use wireless transceiver 142B to wirelessly communicate with HMD 112. In some examples, wireless transceivers 142A, 142B (collectively, "wireless transceivers 142") support 802.11ay standard. In other examples, wireless transceivers 142 support 802.11ax standard. HMD 112 and peripheral device 136 may send and/or receive data (e.g., image or audio samples) via wireless transceivers 142.

To jointly operate within the artificial reality system, HMD 112 and peripheral device 136 each synchronize the timing of processors and hardware of the devices, such as synchronizing the frequency at which peripheral device 136 captures audio or image samples with the frequency at which HMD 112 processes the audio or image samples. In this example, HMD 112 and peripheral device 136 include clock domain 520A associated with processors and hardware within each device. HMD 112 includes system clock 226 that provides a clocking signal for processor 212 and hardware of HMD 112, e.g., SoCs 510, in clock domain 520A. Similarly, peripheral device 136 includes system clock 230 that provides a clocking signal for processor 228 and SoCs 530 in clock domain 520A.

System clocks 226 and 230 may generate clocking signals at different frequencies controlled by oscillators. Oscillators may comprise a crystal oscillator, Armstrong oscillator, Hartley oscillator, RC Phase Shift oscillator, Colpitts oscillator, Cross-Coupled oscillator, Dynatron oscillator, Meissner oscillator, optoelectronic oscillator, Phase Shift oscillator, Wine Bridge oscillator, Robinson oscillator, Tri-Tet Oscillator, or any type of oscillator generating an oscillating electronic signal. In this example, system clock 226 of HMD 112 is connected to oscillator 538A that oscillates at a high frequency (e.g., 38.4 or 24 MHz) and oscillator 540A that oscillates at a low frequency (e.g., 32.768 kHz). Similarly, peripheral device 136 may include system clock 230 that is connected to oscillator 538B that oscillates at a high frequency (e.g., 38.4 or 24 MHz) and oscillator 540B that oscillates at a low frequency (e.g., 32.768 kHz). In this example, system clocks 226 and 230 use low-frequency oscillators 540A and 540B, respectively, when devices are in low-power mode.

HMD 112 and peripheral device 136 also includes clock domain 520B associated with wireless transceivers 142A and 142B. For example, wireless transceiver 142A includes clock 236 and wireless transceiver 142B includes clock 240. Clocks 236 and 240 are used to synchronize the timing between wireless transceivers 142A and 142B in clock domain 520B. Clock 236 connects to oscillators 538A and 540A, and clock 240 connects to oscillators 538B and 540B.

In the example of FIG. 5A, HMD processor 212 and peripheral device processor 228 include clock managers 508 and 528, respectively, that maintain an offset across clock domains 520A and 520B, for synchronizing the timing between HMD 112 and peripheral device 136. To synchronize the timing between HMD 112 and peripheral device 136, assume for example, HMD 112 is the clock master for time synchronization, and peripheral device 136 and wireless transceivers 142, are minions.

To synchronize the timing between HMD 112 and peripheral device 136, the timing of wireless transceiver 142A is first synchronized with the timing of HMD 112. Wireless transceiver 142A sends interrupt 501 to HMD processor 212 and simultaneously or near-simultaneously (e.g., within a small bounded number of clock cycles, <<1 µs) records a local timestamp of clock 236 of wireless transceiver 142A (referred to herein as "wireless transceiver 142A timestamp") at the time the interrupt is sent. Interrupt 501 may comprise hardware signals, such as a General-Purpose Input/Output (GPIO) interrupt or Message Signaled Interrupt (MSI). In this example, wireless transceiver 142A timestamp is a TSF timestamp. That is, the timestamp is a 64-bit timestamp with a minimum of 1 microsecond bit resolution (e.g., where Least Significant Bit (LSB) is 1 microsecond).

In response to receiving interrupt 501 from wireless transceiver 142A, HMD processor 508 captures a timestamp of system clock 226 of HMD 112 (referred to herein as "HMD 112 timestamp") and obtains the wireless transceiver 142A timestamp (e.g., wireless transceiver 142A may send the timestamp after capture). Interrupt 501 acts as a common time synchronization point between HMD 112 and wireless transceiver 142A. As further described below in FIG. 5B, HMD 112 includes channels to store timestamps (illustrated in FIG. 5A as "timestamps 509"). For example, HMD 112 includes capture channels to store timestamps of system clock 226 that are captured when HMD processor 212 receives an interrupt from wireless transceiver 142A, and trigger channels that store timestamps obtained from wireless transceiver 142A.

Clock manager 508 computes a delta between the HMD 112 timestamp and the HMD wireless transceiver 142A timestamp. For example, clock manager 508 may compute the difference between the HMD 112 timestamp and the HMD wireless transceiver 142A timestamp. The delta between the HMD 112 timestamp and the HMD wireless transceiver 142A timestamp represents the offset across clock domains 520A and 520B. Processor 212 sends the delta, e.g., delta 502, to wireless transceiver 142A, which in turn sends delta 502 toward peripheral device 136. In this example, wireless transceiver 142A sends delta 502 into an outgoing packet to wireless transceiver 142B.

To synchronize timing between wireless transceivers 142A and 142B, wireless transceiver 142A of HMD 112 and wireless transceiver 142B of peripheral device 136 may adjust for any processing delays. In some examples, the wireless transceiver 142A timestamp is first adjusted for transmission processing delay (referred to herein as "transmit adjusted timestamp"). For example, wireless transceiver 142A may experience a transmission processing delay from the time the wireless transceiver 142A determines to send delta 502 to when the delta is actually sent via the antenna of wireless transceiver 142A. To accommodate for the transmission processing delay, wireless transceiver 142A may adjust the wireless transceiver 142A timestamp forward by the transmission processing delay before sending the timestamp. For example, wireless transceiver 142A captures a local timestamp (e.g., 1 microsecond resolution) and adjusts the timestamp by the Low Medium Access Control (LMAC) layer and physical layer (PHY) processing delay before sending the packet to the LMAC.

Wireless transceiver 142A sends the packet 503 with the transmit adjusted timestamp of wireless transceiver 142A to wireless transceiver 142B. In response to receiving the transmit adjusted timestamp from wireless transceiver 142A, wireless transceiver 142B adjusts the timestamp for receiving processing delay (referred to herein as "receive adjusted timestamp"). For example, wireless transceiver 142B may experience a receiving processing delay from the time an antenna of wireless transceiver 142B to when the packet is processed by wireless transceiver 142B. To accommodate for the receiving processing delay, wireless transceiver 142B may subtract the receiving processing delay from the transmit adjusted timestamp and adjusts a clock of peripheral device transceiver 142B.

Assuming the timing between wireless transceivers 142 are synchronized, wireless transceiver 142B then initiates time synchronization with peripheral device 136. For example, wireless transceiver 142B sends interrupt 504 to peripheral device processor 228 and simultaneously or near-simultaneously records its local time at the time of interrupt (referred to herein as "wireless transceiver 142B timestamp"). When peripheral device processor 228 receives interrupt 504 from wireless transceiver 142B, clock manager 528 captures a timestamp of system clock 230 of peripheral device 136 (referred to herein as "peripheral device 136 timestamp"), and obtains the wireless transceiver 142B timestamp. As further described below in FIG. 5B, peripheral device 136 includes channels to store timestamps (illustrated in FIG. 5A as "timestamps 529"). For example, peripheral device 136 includes capture channels to store timestamps of system clock 230 that are captured when peripheral device processor 228 receives an interrupt from wireless transceiver 142B, and trigger channels that store timestamps obtained from wireless transceiver 142B.

Clock manager 528 of peripheral device 136 adds to the peripheral device 136 timestamp the time that has passed since issuing interrupt 504. For example, clock manager 528 computes a delta between the peripheral device 136 timestamp and the wireless transceiver 142B timestamp. For example, clock manager 528 may compute the difference between the peripheral device 136 timestamp and the peripheral device wireless transceiver 142B timestamp. Clock manager 528 may update system clock 230 using the delta received from HMD 112 and the delta computed between the peripheral device 136 timestamp and the wireless transceiver 142B timestamp.

In the examples described in this disclosure, the time synchronization assumes that HMD 112 is the clock master and peripheral device 136 is the minion. In some examples, the techniques described herein are additionally, or alternatively, applicable to examples in which peripheral device 136 is the clock master and HMD 112 is the minion. In these examples, a delta is computed between peripheral device 136 and wireless transceiver 142B, which is sent toward HMD 112 via wireless transceiver 142B. The timing is then synchronized between HMD 112 and wireless transceiver 142A using the delta received from peripheral device 136 and a delta computed between a timestamp of wireless transceiver 142A and a timestamp of HMD 112.

Although the examples described herein are described with respect to wireless transceivers 142 that support 802.11ay, the techniques described in this disclosure are also applicable to wireless transceivers 142 that support 802.11ax, or other wireless transceivers. Moreover, the time synchronization may occur each time a wireless transceiver wakes up for transmission (e.g., nominally every ⅟₆₀ seconds when wireless transceiver).

Figure 5B:
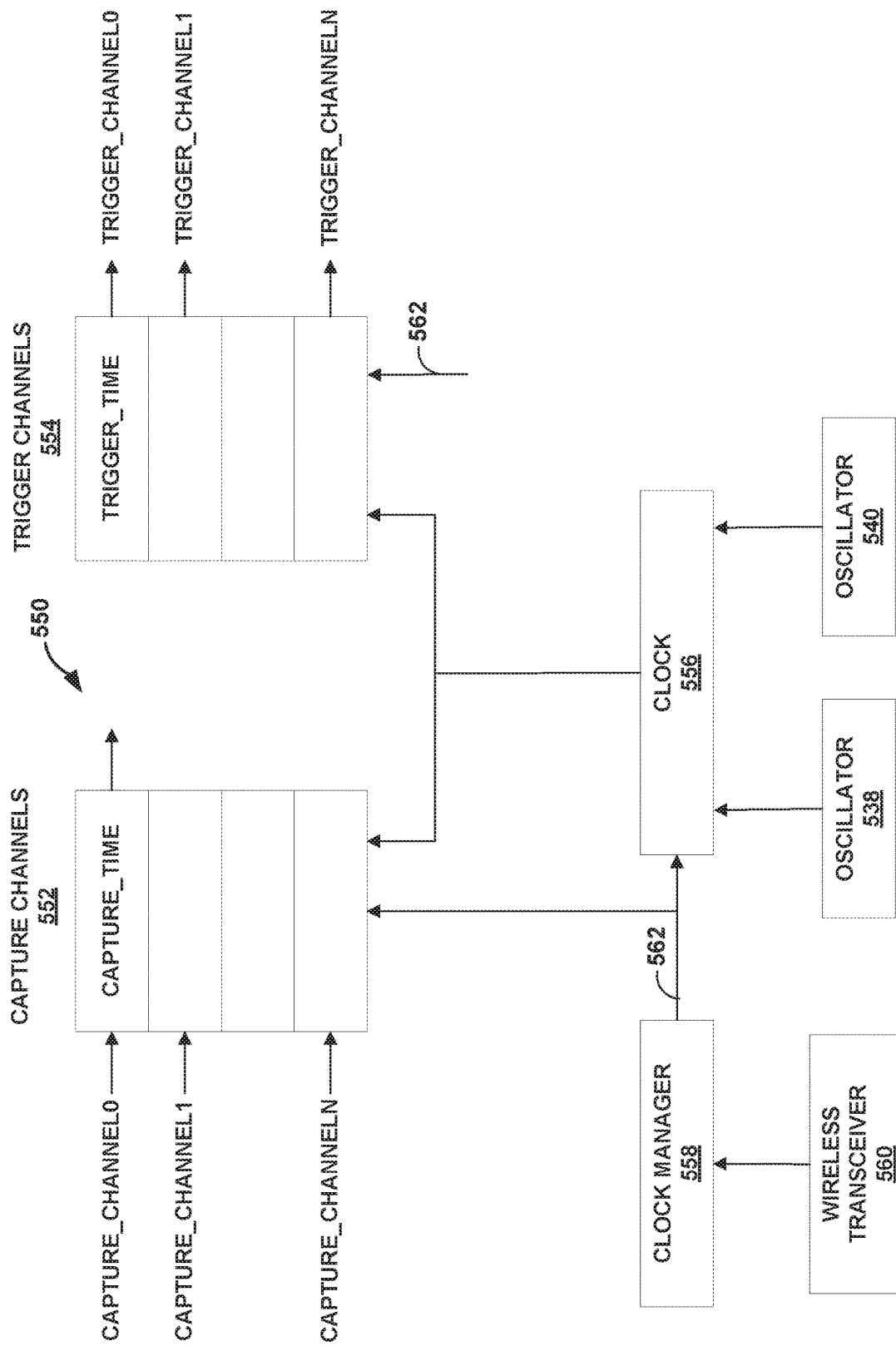
FIG. 5B is a block diagram illustrating a device configured to provide time synchronization across various clock domains of devices within a multi-device artificial reality system, in accordance with the techniques described in this disclosure.

FIG. 5B is a block diagram illustrating a device configured to provide time synchronization, in accordance with the techniques described in this disclosure. Device 550 may represent an example implementation of HMD 112 or peripheral device 136 of FIGS. 1A-5A.

In the example of FIG. 5B, device 550 may comprise a capture channels 552, trigger channels 554, system clock 556 that is connected to oscillator 538 (e.g., oscillating at 24 MHz or 38.4 MHz) and oscillator 540 (e.g., oscillating at 32.768 kHz), clock manager 558, and wireless transceiver 560. During partial shutdown (e.g., low power mode), clock 554 will be maintained by a slower real-time clock (RTC), e.g., oscillator 540.

Capture channels 552 take as inputs hardware signals (e.g., interrupts or external General Purpose Inputs/Outputs (GPIOs)) and capture the local timestamp when hardware signals are received. For example, wireless transceiver 560 may send an interrupt or GPIO to device 550. In response to receiving the interrupt from wireless transceiver 560, clock manager 558 captures the timestamp of clock 556 and stores the captured timestamp in capture channels 552. The timestamp is accessible via a bus 562, e.g., Advanced Peripheral Bus (APB), and/or may be routed to a separate memory-mapped location (e.g., PCIe-mapped memory), as necessary.

Trigger channels 554 are configured via bus 562 with a value at which the trigger channel should be active. For example, when wireless transceiver 560 triggers an interrupt or GPIO to device 550, wireless transceiver 560 captures a timestamp of the wireless transceiver and sends the timestamp to device 550. Device 550 stores the timestamp of the wireless transceiver in trigger channels 554.

Clock manager 558 of device 550 may compute a delta between the timestamps stored in capture channels 552 and trigger channels 554. In the example in which device 550 is a clock master, clock manager 558 sends the delta to wireless transceiver 560, which adjusts its local clock using the delta. In the example in which device 550 is a clock minion, clock manager 558 may adjust clock 556 using the delta.

Figure 5C:
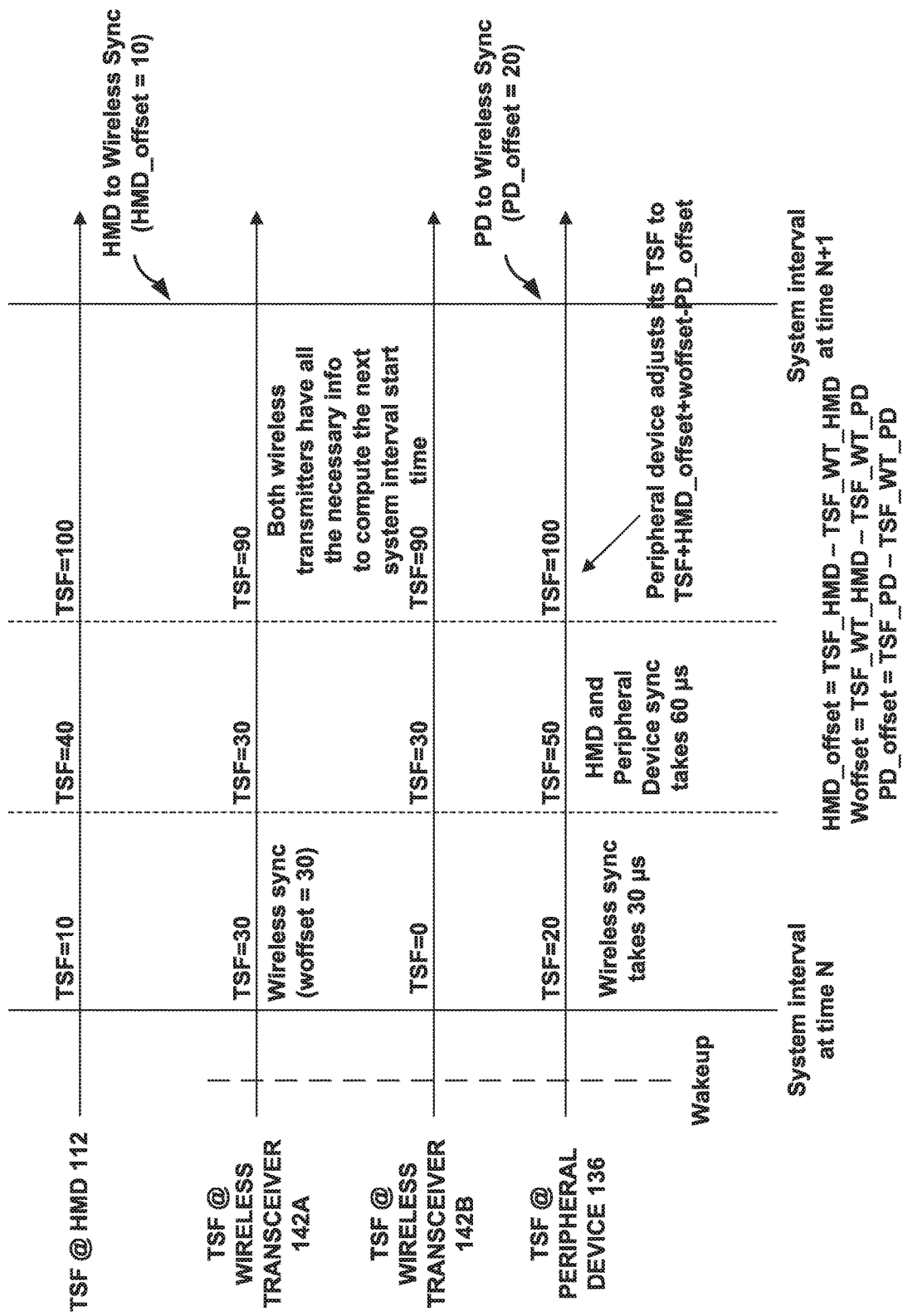
FIG. 5C is a timing diagram illustrating a time synchronization operation across various clock domains of devices within a multi-device artificial reality system, in accordance with the techniques described in this disclosure.

FIG. 5C is a timing diagram of a time synchronization operation, in accordance with the techniques described in this disclosure. The timing diagram of FIG. 5C is described with respect to the multi-device artificial reality system described in FIG. 5A.

In the example of FIG. 5C, wireless transceiver 142B of peripheral device 136 may wake up earlier than wireless transceiver 142A. Wireless transceiver 142B may wake up through an internal clock or from a signal from peripheral device 136. In this example, a timestamp (e.g., TSF timestamp) of wireless transceiver 142B at wakeup is TSF=0. Wireless transceiver 142A may wake up later through an internal clock or from a signal from HMD 112. In this example, the TSF at wireless transceiver 142A at wakeup is TSF=30.

After wireless transceivers 142 have woken up, wireless transceivers 142 may initialize synchronization using standard TSF synchronization, for example. For example, wireless transceiver 142A may send a message (e.g., Beam Refinement Protocol (BRP) packet or HS packet) to wireless transceiver 142B to synchronize timing. For example, wireless transceiver 142B may send a message including its local timestamp (e.g., TSF=0) of clock 240 to wireless transceiver 142A. Wireless transceivers 142 may then synchronize timing such that wireless transceivers 142 each have the same timestamp (e.g., TSF=30).

In this example, to synchronize timing between HMD 112 and peripheral device 136, HMD 112 is the clock master, and peripheral device 136 is the minion. To synchronize between HMD 112 and peripheral device 136, wireless transceiver 142A may first synchronize timing with HMD 112. For example, the firmware of wireless transceiver 142A disables its Microcontroller Unit (MCU) interrupt, and generates and sends an interrupt (e.g., general-purpose input/output (GPIO) interrupt or Message-Signaled Interrupts (MIS)) to HMD 112. Simultaneously, or near-simultaneously with the interrupt, wireless transceiver 142A captures its local timestamp (e.g., through Advanced High-performance Bus (AHB)) of clock 236. The firmware of wireless transceiver 142A may send an event to a driver of HMD 112 to send the timestamp to HMD 112. In the example of FIG. 5C, wireless transceiver 142A captures a timestamp of TSF=30 and sends the timestamp to HMD 112.

In response to receiving the interrupt, clock manager 508 of HMD 112 captures a local timestamp of system clock 226. For example, HMD 112 has a local timestamp of TSF=10 at time N. After wireless transceivers 142 are synchronized, which in this example takes 30 microseconds, HMD 112 has a local timestamp of TSF=40. Clock manager 508 of HMD 112 computes a delta (e.g., "HMD_offset") of the timestamp of HMD 112 (e.g., TSF=40) and the timestamp of wireless transceiver 142A (e.g., TSF=30). In this example, HMD 112 computes an HMD_offset of 10, and sends HMD_offset to wireless transceiver 142A, which in turn adjusts its local clock using the HMD_offset.

Wireless transceiver 142A then synchronizes with wireless transceiver 142B. For example, wireless transceiver 142A inserts its local timestamp (e.g., TSF=30) into an outgoing packet (e.g., BRP message). In some examples, wireless transceiver 142A adjusts the timestamp to account for transmission processing delay (e.g., the delay from the time wireless transceiver 142A captures its local timestamp to when the packet reaches the antenna) and sends the adjusted timestamp to wireless transceiver 142B. In response to receiving the adjusted timestamp from wireless transceiver 142A, wireless transceiver 142B adjusts the received timestamp to account for receiving processing delay (e.g., the delay from the time antenna receives the packet to the packet being processed). Wireless transceiver 142B then subtracts the processing delay from the timestamp from HMD transceiver 142A. In this example, the processing delay is assumed as negligible and the offset (e.g., "w_offset") between transceivers 142 is 0.

Wireless transceiver 142B then synchronizes with peripheral device 136. For example, the firmware of wireless transceiver 142B generates an interrupt (e.g., GPIO or MIS), reads its local timestamp through Advanced High-performance Bus (AHB), and sends the timestamp to peripheral device 136. In the example of FIG. 5C, wireless transceiver 142B reads a timestamp of TSF=30. In response to receiving the interrupt, a clock (e.g., clock 240 of FIG. 5A) of peripheral device 136 captures a local timestamp, e.g., TSF=50. A processor (e.g., peripheral devices processor 528) of peripheral device 136 computes a delta (e.g., "PD_offset") of the timestamp of peripheral device 136 (e.g., TSF=50) and the timestamp of wireless transceiver 142B (e.g., TSF=30). In this example, peripheral device 136 computes a PD_offset of 20. Peripheral device 136 then adjusts its local clock (e.g., clock 240 of FIG. 5A) using the HMD_offset, woffset, and PD_offset (e.g., clock 240 of FIG. 5A) TSF=HMD_offset+woffset−PD_offset). For example, the synchronization between HMD 112 and peripheral device 136 may take 60 microseconds from start to finish. In this example, peripheral device 136 may have an unadjusted timestamp of TSF=110, which is then adjusted (e.g., TSF=−10), for an adjusted timestamp of TSF=100, which is synchronized with the timestamp of HMD 112.

In response to synchronizing the clocks between HMD 112 and peripheral device 136, a driver of HMD 112 or a driver of peripheral device 136 may notify wireless transceivers of the next data activity, such as a vertical sync (VSYNC), graphics processor unit (GPU) output, sensor readout (e.g., image capture devices), etc. Wireless transceivers may also update a next wakeup time based on the HMD_offset.

FIG. 6 is a block diagram illustrating a more detailed example implementation of a distributed architecture for a multi-device artificial reality system in which one or more devices are implemented using one or more SoC integrated circuits within each device. As described, peripheral device 136 and HMD 112 are architected and configured to enable time synchronization in accordance with the techniques described in this disclosure.

In general, the SoCs illustrated in FIG. 6 represent a collection of specialized integrated circuits arranged in a distributed architecture, where each SoC integrated circuit includes various specialized functional blocks configured to provide an operating environment for artificial reality applications. FIG. 6 is merely one example arrangement of SoC integrated circuits. The distributed architecture for a multi-device artificial reality system may include any collection and/or arrangement of SoC integrated circuits.

In this example, SoC 630A of HMD 112 comprises functional blocks including tracking 670, an encryption/decryption 680, co-processors 682, security processor 683, and an interface 684. Tracking 670 provides a functional block for eye tracking 672 ("eye 672"), hand tracking 674 ("hand 674"), depth tracking 676 ("depth 676"), and/or Simultaneous Localization and Mapping (SLAM) 678 ("SLAM 678"). For example, HMD 112 may receive input from one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. HMD 112 may also receive image data from one or more image capture devices 688A-688N (collectively, "image capture devices 688"). Image capture devices may include video cameras, laser scanners, Doppler radar scanners, depth scanners, or the like, configured to output image data representative of the physical environment. More specifically, image capture devices capture image data representative of objects (including peripheral device 136 and/or hand) in the physical environment that are within a field of view of image capture devices, which typically corresponds with the viewing perspective of HMD 112. Based on the sensed data and/or image data, tracking 670 determines, for example, a current pose for the frame of reference of HMD 112 and, in accordance with the current pose, renders the artificial reality content. Although HMD 112 is illustrated as including image capture devices, HMD 112 may additionally, or alternatively, include one or more audio capture devices, such as microphones or the like. In some examples, peripheral device 136 may also receive image data from one or more image capture devices (not shown in FIG. 6) or audio data from one or more audio capture devices (not shown in FIG. 6).

Encryption/decryption 680 is a functional block to encrypt outgoing data communicated to peripheral device 136 and decrypt incoming data communicated from peripheral device 136. As one example, encryption/decryption 680 may support symmetric key cryptography to encrypt/decrypt data with a session key (e.g., secret symmetric key).

Co-application processors 682 includes various processors such as a video processing unit, graphics processing unit, digital signal processors, encoders and/or decoders, and/or others.

Security processor 683 provides secure device attestation and mutual authentication of HMD 112 when pairing with devices, e.g., peripheral device 606, used in conjunction within the AR environment. Security processor 683 may authenticate SoCs 630A-630C of HMD 112.

Interface 684 is a functional block that includes one or more interfaces for connecting to functional blocks of SoC 630A. As one example, interface 684 may include peripheral component interconnect express (PCIe) slots. SoC 630A may connect with SoC 630B, 630C using interface 684. SoC 630A may connect with a communication device, e.g., wireless transceiver 690B, using interface 684 for communicating with other devices, e.g., peripheral device 136.

SoCs 630B and 630C each represents display controllers for outputting artificial reality content on respective displays, e.g., displays 686A, 686B (collectively, "displays 686"). In this example, SoC 630B may include a display controller for display 668A to output artificial reality content for a left eye 687A of a user. For example, SoC 630B includes a decryption block 692A, decoder block 694A, display controller 696A, and/or a pixel driver 698A for outputting artificial reality content on display 686A. Similarly, SoC 630C may include a display controller for display 668B to output artificial reality content for a right eye 687B of the user. For example, SoC 630C includes decryption 692B, decoder 694B, display controller 696B, and/or a pixel driver 698B for generating and outputting artificial reality content on display 686B. Displays 668 may include Light-Emitting Diode (LED) displays, Organic LEDs (OLEDs), Quantum dot LEDs (QLEDs), Electronic paper (E-ink) displays, Liquid Crystal Displays (LCDs), or other types of displays for displaying AR content.

Peripheral device 136 includes SoCs 610A and 610B configured to support an artificial reality application. In this example, SoC 610A comprises functional blocks including tracking 640, an encryption/decryption 650, a display processor 652, an interface 654, and security processor 656. Tracking 640 is a functional block providing eye tracking 642 ("eye 642"), hand tracking 644 ("hand 644"), depth tracking 646 ("depth 646"), and/or Simultaneous Localization and Mapping (SLAM) 648 ("SLAM 648"). For example, peripheral device 136 may receive input from one or more accelerometers (also referred to as inertial measurement units or "IMUs") that output data indicative of current acceleration of peripheral device 136, GPS sensors that output data indicative of a location of peripheral device 136, radar or sonar that output data indicative of distances of peripheral device 136 from various objects, or other sensors that provide indications of a location or orientation of peripheral device 136 or other objects within a physical environment. Peripheral device 136 may in some examples also receive image data from one or more image capture devices, such as video cameras, laser scanners, Doppler radar scanners, depth scanners, or the like, configured to output image data representative of the physical environment. Based on the sensed data and/or image data, tracking block 640 determines, for example, a current pose for the frame of reference of peripheral device 136 and, in accordance with the current pose, renders the artificial reality content to HMD 112.

Encryption/decryption 650 encrypts outgoing data communicated to HMD 112 and decrypts incoming data communicated from HMD 112. As one example, encryption/decryption 550 may support symmetric key cryptography to encrypt/decrypt data using a session key (e.g., secret symmetric key).

Display processor 652 includes one or more processors such as a video processing unit, graphics processing unit, encoders and/or decoders, and/or others, for rendering artificial reality content to HMD 112.

Interface 654 includes one or more interfaces for connecting to functional blocks of SoC 510A. As one example, interface 684 may include peripheral component interconnect express (PCIe) slots. SoC 610A may connect with SoC 610B using interface 684. SoC 610A may connect with one or more communication devices, e.g., wireless transceiver 690A using interface 654 for communicating with other devices, e.g., HMD 112.

Security processor 656 provides secure device attestation and mutual authentication of peripheral device 136 when pairing with devices, e.g., HMD 112, used in conjunction within the AR environment. Security processor 656 may authenticate SoCs 610A, 610B of peripheral device 136.

SoC 610B includes co-application processors 660 and application processors 662. In this example, co-application processors 660 includes various processors, such as a vision processing unit (VPU), a graphics processing unit (GPU), microcontroller unit (MCU), and/or central processing unit (CPU). Application processors 662 may include a processing unit for executing one or more artificial reality applications to generate and render artificial reality content.

As described above, peripheral device 136 may connect to HMD 112 using wireless transceiver 690A. For example, peripheral device 136 may interconnect with wireless transceiver 690A using interface 654. Similarly, HMD 112 may connect to peripheral device 136 using wireless transceiver 690B. For example, HMD 112 may interconnect with wireless transceiver 690B using interface 684. Similarly, as described in the example of FIG. 5A, the techniques provide time synchronization between HMD 112 and peripheral device 136 by synchronizing between HMD 112 and wireless transceiver 690B, between wireless transceivers 690, and between wireless transceiver 690A and peripheral device 136.

Figure 7:
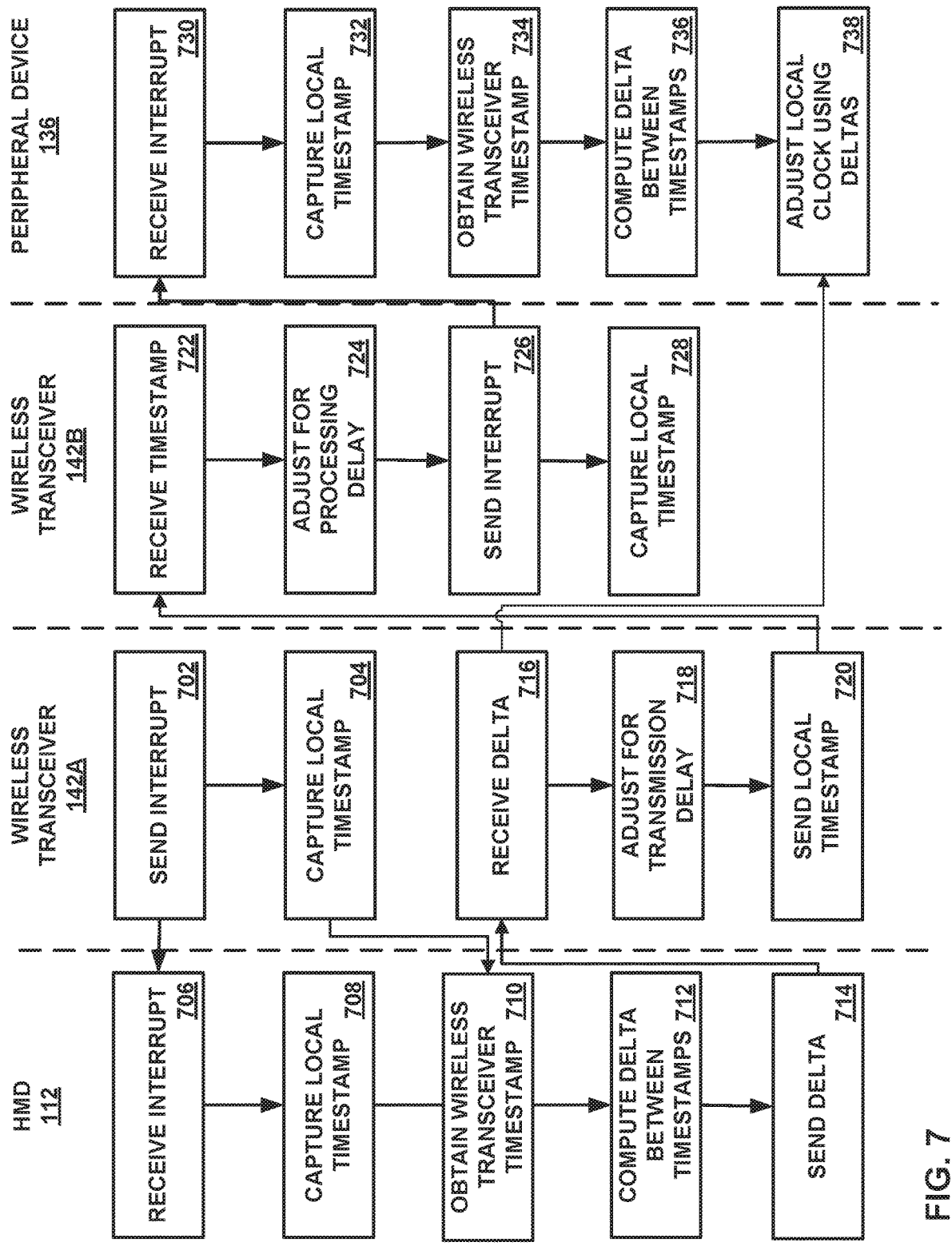
FIG. 7 is a flowchart illustrating an example time synchronization operation across various clock domains of devices within a multi-device artificial reality system, in accordance with the techniques described in this disclosure.

FIG. 7 is a flowchart illustrating an example time synchronization operation, in accordance with the techniques described in this disclosure. The example time synchronization operation of FIG. 7 is described with respect to the multi-device artificial reality system of FIG. 5A.

In the example of FIG. 7, wireless receiver 142A may send an interrupt to HMD 112 (702). Simultaneously or near-simultaneously (e.g., within a small bounded number of clock cycles), wireless transceiver 142A records a local timestamp (e.g., TSF timestamp) of wireless transceiver 142A (referred to herein as "wireless transceiver 142A timestamp") at the time the interrupt is sent (704).

In response to receiving the interrupt from wireless transceiver 142A (706), HMD processor 212 captures a timestamp of HMD 112 (referred to herein as "HMD 112 timestamp") (708). This interrupt acts as a common time synchronization point between HMD 112 and wireless transceiver 142A. HMD processor 508 compares the HMD 112 timestamp with the wireless transceiver 534A timestamp obtained from wireless transceiver 142A (710) and computes a delta between the two timestamps (712). HMD 112 sends the delta (714), e.g., delta 502, to wireless transceiver 142A, which in turn sends the delta toward peripheral device 136. (716).

Wireless transceiver 142B of peripheral device 136 then synchronizes timing to wireless transceiver 142A of HMD transceiver 142A. To synchronize the timing between wireless transceivers 142, wireless transceiver 142A adjusts its local timestamp for transmission processing delays (718) and sends the adjusted local timestamp (e.g., wireless transceiver 142A timestamp) to wireless transceiver 142B (720). The wireless transceiver 534A timestamp is first adjusted for transmission processing delay, and is referred to herein as "transmit adjusted timestamp." For example, wireless transceiver 142A may experience a processing delay from the time the wireless transceiver 142A determines to send its local timestamp to when the packet is actually sent via the antenna of wireless transceiver 142A. To accommodate for the transmission processing delay, wireless transceiver 142A may adjust the wireless transceiver 142A timestamp forward by the processing delay. For example, wireless transceiver 142A captures a local timestamp (e.g., 1 microsecond resolution) and adjusts the timestamp by the Low Medium Access Control (LMAC) layer and physical layer (PHY) processing delay before sending the packet to the LMAC. The wireless transceivers may be synchronized prior to the synchronization between HMD 112 and HMD transceiver 142A, such as when wireless transceivers wake up for transmission.

In response to receiving the transmit adjusted timestamp from wireless transceiver 142A (722), wireless transceiver 142B adjusts the received timestamp for receiving processing delay (referred to herein as "receiving adjusted timestamp") (724). For example, wireless transceiver 142B may experience a processing delay from the time an antenna of wireless transceiver 142B to when the packet is processed by wireless transceiver 142B. To accommodate for the receiving processing delay, wireless transceiver 142B may add the receiving processing delay to the transmit adjusted timestamp. Wireless transceiver 142B then subtracts the processing delay (e.g., the transmission processing delay and receiving processing delay) from the timestamp from wireless transceiver 142A and adjusts its local clock.

Wireless transceiver 142B then synchronizes with peripheral device 136. For example, wireless transceiver 534B generates and sends an interrupt to peripheral device processor 228 (726). Simultaneously or near-simultaneously, wireless transceiver 142B captures its local time at the time of interrupt (referred to herein as "wireless transceiver 142B timestamp") (728).

When peripheral device 136 receives the interrupt from wireless transceiver 534B (730), peripheral device processor 228 captures a local timestamp of peripheral device 136 (referred to herein as "peripheral device 136 timestamp") (732). Peripheral device processor 228 obtains the timestamp from wireless transceiver 534B (734) and computes a delta between the two timestamps (736). Peripheral device processor 228 may update its local clock (e.g., timing of peripheral device processor 228) using the delta received from HMD 112 and the delta computed between the peripheral device 136 timestamp and the wireless transceiver 534B timestamp (738).

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head mounted device (HMD) connected to a host computer system, a standalone HMD, a mobile device or computing system, or any other hardware platform capable of providing artificial reality content to one or more viewers.

What is claimed is:

1. An artificial reality system comprising:
 a head-mounted display (HMD) configured to output artificial reality content, wherein the HMD includes a first wireless transceiver to communicate with one or more devices of the artificial reality system;
 a peripheral device of the one or more devices of the artificial reality system configured to capture media samples for the HMD to output the artificial reality content, wherein the peripheral device includes a second wireless transceiver to communicate with the HMD;
 a clock manager of the HMD configured to compute a first delta between a timestamp of the HMD and a timestamp of the first wireless transceiver; and
 a clock manager of the peripheral device configured to compute a second delta between a timestamp of the peripheral device and a timestamp of the second wireless transceiver, wherein the first delta and the second delta are used to adjust a clock of the peripheral device.

2. The artificial reality system of claim 1,
wherein the second wireless transceiver is synchronized to the first wireless transceiver.

3. The artificial reality system of claim 2,
wherein the timestamp of the first wireless transceiver comprises a first timestamp,
wherein the first wireless transceiver is further configured to send a second timestamp of the first wireless transceiver to the second wireless transceiver to synchronize the timing of the second wireless transceiver to the first wireless transceiver, wherein the second timestamp is adjusted for transmission processing delay, and
wherein the second wireless transceiver is further configured to receive the second timestamp of the first wireless transceiver and adjust the second timestamp for receiving processing delay.

4. The artificial reality system of claim 1,
wherein the timestamp of the HMD is when the HMD receives an interrupt from the first wireless transceiver, and
wherein the timestamp of the first wireless transceiver is when the first wireless transceiver sends the interrupt to the HMD.

5. The artificial reality system of claim 1,
wherein the timestamp of the peripheral device is when the peripheral device receives an interrupt from the second wireless transceiver, and
wherein the timestamp of the second wireless transceiver is when the second wireless transceiver sends the interrupt to the peripheral device.

6. The artificial reality system of claim 1,
wherein the timestamp of the HMD, the timestamp of the first wireless transceiver, the timestamp of the peripheral device, and the timestamp of the second wireless receiver are Time Synchronization Function timestamps.

7. The artificial reality system of claim 1,
wherein the HMD comprises:
one or more capture channels that store timestamps of the HMD that are recorded in response to receiving the interrupt from the first wireless transceiver;
one or more trigger channels that store timestamps of the first wireless transceiver that was recorded at the time the interrupt from the first wireless transceiver was sent to the HMD; and
wherein the peripheral device comprises:
one or more capture channels that store timestamps of the peripheral device that are recorded in response to receiving the interrupt from the second wireless transceiver; and
one or more trigger channels that store timestamps of the second wireless transceiver that was recorded at the time the interrupt from the second wireless transceiver was sent to the peripheral device.

8. The artificial reality system of claim 1,
wherein the HMD comprises an HMD system clock that generates a first clocking signal for hardware of the HMD,
wherein the first wireless transceiver comprises a first wireless transceiver clock that generates a second clocking signal for the first wireless transceiver,
wherein the second wireless transceiver comprises a second wireless transceiver clock generating a third clocking signal for the second wireless transceiver, and
wherein the peripheral device comprises a peripheral device system clock generating a fourth clocking signal for hardware of the peripheral device.

9. The artificial reality system of claim 8,
wherein the first, second, third, and fourth clocking signals are generated using a first oscillator that oscillates at a high frequency of 38.4 megahertz (MHz) or 24 MHz when the first wireless transceiver and second wireless transceiver are operating on a first mode, and
wherein the first, second, third, and fourth clocking signals are generated using a second oscillator that oscillates at a low frequency of 32.768 kilohertz (kHz) when the first wireless transceiver and second wireless transceiver are operating on a second mode.

10. The artificial reality system of claim 1, wherein the first wireless transceiver and second wireless transceiver are configured in accordance with 802.11ay or 802.11ax.

11. A method comprising:
receiving, by a head-mounted display (HMD) configured to output artificial reality content, an interrupt from a wireless transceiver of the HMD to communicate with a peripheral device configured to capture media samples for the artificial reality content;
in response to receiving the interrupt, recording, by the HMD, a timestamp of the HMD;
obtaining, by the HMD, a timestamp of the wireless transceiver of the HMD that is recorded at the time the wireless transceiver of the HMD sent the interrupt;
computing, by the HMD, a delta between the timestamp of the HMD and the timestamp of the wireless transceiver of the HMD; and
sending, by the HMD, the delta to the peripheral device via the wireless transceiver of the HMD to cause the peripheral device to adjust a clock of the peripheral device using the delta.

12. The method of claim 11, further comprising:
sending, by the wireless transceiver of the HMD, the interrupt to the HMD to cause the HMD to capture the timestamp of the HMD in response to receiving the interrupt;
capturing, by the wireless transceiver of the HMD, the timestamp of the wireless transceiver of the HMD at the time the interrupt is sent;
receiving, by the wireless transceiver of the HMD and from the HMD, the delta; and
sending, by the wireless transceiver of the HMD, the delta to the peripheral device.

13. The method of claim 12, wherein the timestamp of the wireless transceiver of the HMD comprises a first timestamp, the method further comprising:
sending, by the wireless transceiver of the HMD, a second timestamp of the wireless transceiver of the HMD to a wireless transceiver of the peripheral device to synchronize the timing of the wireless transceiver of the peripheral device to the wireless transceiver of the HMD, wherein the second timestamp is adjusted for transmission processing delay.

14. The method of claim 13, wherein the wireless transceiver of the HMD and the wireless transceiver of the peripheral device are configured to support 802.11ax or 802.11ay.

15. The method of claim 11, wherein the timestamp of the HMD and the timestamp of the wireless transceiver of the HMD are Time Synchronization Function timestamps.

16. A method comprising:
receiving, by a peripheral device configured to capture media sample for the artificial reality content, a first delta between a timestamp of a head-mounted display (HMD) and a timestamp of a wireless transceiver of the HMD, wherein the HMD is configured to output artificial reality content;

receiving, by the peripheral device, an interrupt from a wireless transceiver of the peripheral device;

in response to receiving the interrupt, capturing, by the peripheral device, a timestamp of the peripheral device;

obtaining, by the peripheral device, a timestamp of the wireless transceiver of the peripheral device, wherein the timestamp of the wireless transceiver of the peripheral device is recorded at the time the wireless transceiver of the peripheral device sent the interrupt;

computing, by the peripheral device, a second delta between the timestamp of the peripheral device and the timestamp of the wireless transceiver of the peripheral device; and adjusting, by the peripheral device, a clock of the peripheral device using the first delta and the second delta.

17. The method of claim 16, further comprising:

sending, by the wireless transceiver of the peripheral device, the interrupt to the peripheral device to cause the peripheral device to capture the timestamp of the peripheral device in response to receiving the interrupt;

capturing, by the wireless transceiver of the peripheral device, the timestamp of the wireless transceiver of the peripheral device at the time the interrupt is sent; and sending, by the wireless transceiver of the peripheral device, the timestamp of the wireless transceiver of the peripheral device to the peripheral device.

18. The method of claim 17, wherein the timestamp of the wireless transceiver of the HMD comprises a first timestamp, the method further comprising:

receiving, by the wireless transceiver of the peripheral device, a second timestamp of the wireless transceiver of the HMD, wherein the second timestamp of the wireless transceiver of the HMD is adjusted for transmission processing delay;

adjusting, by the wireless transceiver of the peripheral device, the second timestamp of the wireless transceiver of the HMD for receiving processing delay; and adjusting, by the wireless transceiver of the peripheral device, a clock of the wireless transceiver of the peripheral device using the adjusted second timestamp.

19. The method of claim 17, wherein the timestamp of the HMD, the timestamp of the wireless transceiver of the HMD, the timestamp of the peripheral device, and the timestamp of the wireless transceiver of the peripheral device are Time Synchronization Function timestamps.

20. The method of claim 16, wherein the wireless transceiver of the HMD and the wireless transceiver of the peripheral device are configured in accordance with 802.11ax or 802.11ay.

* * * * *